US010223456B2

(12) United States Patent
Annau et al.

(10) Patent No.: US 10,223,456 B2
(45) Date of Patent: *Mar. 5, 2019

(54) BOOSTED SLASHTAGS

(71) Applicant: International Business Machines Corporation, Armonk, NY (US)

(72) Inventors: Thomas M. Annau, San Carlos, CA (US); Gregory B. Lindahl, Sunnyvale, CA (US); Samuel Makonnen, San Francisco, CA (US); Michael Markson, San Francisco, CA (US); Keith Peters, San Francisco, CA (US); Robert Michael Saliba, San Francisco, CA (US); Al Sary, Richmond, CA (US); Rich Skrenta, San Carlos, CA (US); Dan Swartz, Mountain View, CA (US); Robert N. Truel, San Carlos, CA (US); Timothy Walters, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 953 days.

This patent is subject to a terminal disclaimer.

(21) Appl. No.: 13/873,415

(22) Filed: Apr. 30, 2013

(65) Prior Publication Data
US 2014/0149373 A1 May 29, 2014

Related U.S. Application Data

(63) Continuation of application No. PCT/US2011/058674, filed on Oct. 31, 2011.
(Continued)

(51) Int. Cl.
G06F 7/00 (2006.01)
G06F 17/30 (2006.01)
G06F 17/27 (2006.01)

(52) U.S. Cl.
CPC ...... *G06F 17/30867* (2013.01); *G06F 17/276* (2013.01); *G06F 17/3053* (2013.01);
(Continued)

(58) Field of Classification Search
CPC ......... G06F 17/30312; G06F 17/30646; G06F 17/30578; G06F 17/30867; G06F 17/30864
See application file for complete search history.

(56) References Cited

U.S. PATENT DOCUMENTS 7,146,361 B2   12/2006   Broder et al.
7,512,602 B2   3/2009    Broder et al.
(Continued)

FOREIGN PATENT DOCUMENTS

CN   1573744 A     2/2005
CN   101542482 A   9/2009
(Continued)

OTHER PUBLICATIONS

Final Office Action from U.S. Appl. No. 13/873,349, dated Jul. 15, 2015.
(Continued)

*Primary Examiner* — Boris Gorney
*Assistant Examiner* — Christy Y Kim
(74) *Attorney, Agent, or Firm* — Zilka-Kotab, P.C.

(57) ABSTRACT

A search engine system, including a slashtag server configured to detect at least one search operator in a search query and detect a boosting indicator associated with the at least one search operator. Additionally, a web server configured to, in response to the detected boosting indicator, and generate a first search result that includes a boosted ranking of at least a subset a plurality of search result items in the search result and display the first search result in a web browser.

13 Claims, 28 Drawing Sheets

Related U.S. Application Data

(60) Provisional application No. 61/488,112, filed on May 19, 2011, provisional application No. 61/420,267, filed on Dec. 6, 2010, provisional application No. 61/408,608, filed on Oct. 30, 2010.

(52) U.S. Cl.
CPC .. *G06F 17/30448* (2013.01); *G06F 17/30477* (2013.01); *G06F 17/30672* (2013.01); *G06F 17/30864* (2013.01); *G06F 17/30973* (2013.01)

(56) References Cited

U.S. PATENT DOCUMENTS

| | | | |
|---|---|---|---|
| 7,788,260 | B2 | 8/2010 | Lunt et al. |
| 8,280,903 | B2 | 10/2012 | Broder et al. |
| 8,468,271 | B1 | 6/2013 | Panwar et al. |
| 8,478,800 | B1 | 7/2013 | Johnson et al. |
| 8,965,786 | B1 | 2/2015 | Frumkin et al. |
| 8,990,193 | B1 | 3/2015 | Reynar et al. |
| 9,342,607 | B2 | 5/2016 | Annau et al. |
| 9,864,805 | B2 | 1/2018 | Annau et al. |
| 10,007,705 | B2 | 6/2018 | Annau et al. |
| 2003/0033298 | A1* | 2/2003 | Sundaresan ....... G06F 17/30864 |
| 2004/0030780 | A1* | 2/2004 | Walters ............. G06F 17/30887 709/225 |
| 2004/0243557 | A1 | 12/2004 | Broder et al. |
| 2005/0228780 | A1 | 10/2005 | Diab et al. |
| 2006/0004892 | A1 | 1/2006 | Lunt et al. |
| 2006/0041533 | A1* | 2/2006 | Koyfman .......... G06F 17/30312 |
| 2006/0074871 | A1 | 4/2006 | Meyerzon et al. |
| 2006/0143185 | A1 | 6/2006 | Kuroyanagi |
| 2006/0230005 | A1 | 10/2006 | Bailey et al. |
| 2007/0112759 | A1* | 5/2007 | Kulakow .......... G06F 17/30646 |
| 2007/0112763 | A1 | 5/2007 | Broder et al. |
| 2007/0156669 | A1 | 7/2007 | Marchisio et al. |
| 2007/0265996 | A1 | 11/2007 | Odom et al. |
| 2008/0134047 | A1 | 6/2008 | Pasupathy |
| 2008/0235608 | A1 | 9/2008 | Prabhu |
| 2009/0132516 | A1* | 5/2009 | Patel ................. G06F 17/30867 |
| 2009/0222441 | A1 | 9/2009 | Broder et al. |
| 2009/0288141 | A1 | 11/2009 | Khachaturov |
| 2010/0070928 | A1 | 3/2010 | Goodger et al. |
| 2010/0082604 | A1 | 4/2010 | Gutt et al. |
| 2010/0191758 | A1 | 7/2010 | Peng et al. |
| 2010/0257150 | A1 | 10/2010 | Lu et al. |
| 2010/0306288 | A1* | 12/2010 | Stein ................. G06F 17/30312 707/609 |
| 2010/0325100 | A1 | 12/2010 | Forstall et al. |
| 2011/0119268 | A1 | 5/2011 | Rajaram et al. |
| 2011/0153414 | A1 | 6/2011 | Elvekrog et al. |
| 2011/0178995 | A1 | 7/2011 | Suchter et al. |
| 2011/0196853 | A1 | 8/2011 | Bigham et al. |
| 2011/0246457 | A1 | 10/2011 | Dong et al. |
| 2011/0320441 | A1 | 12/2011 | Lee et al. |
| 2012/0150844 | A1* | 6/2012 | Lindahl ............. G06F 17/30578 707/722 |
| 2013/0238587 | A1 | 9/2013 | Annau et al. |
| 2013/0238588 | A1 | 9/2013 | Annau et al. |
| 2013/0246404 | A1 | 9/2013 | Annau et al. |
| 2013/0246405 | A1 | 9/2013 | Annau et al. |
| 2016/0239576 | A1 | 8/2016 | Annau et al. |

FOREIGN PATENT DOCUMENTS

| | | |
|---|---|---|
| CN | 101641697 A | 2/2010 |
| WO | 2004090754 A1 | 10/2004 |

OTHER PUBLICATIONS

Final Office Action from U.S. Appl. No. 13/873,376, dated Aug. 14, 2015.
Annau et al., U.S. Appl. No. 13/873,349, filed Apr. 30, 2013.
Non-Final Office Action from U.S. Appl. No. 13/873,349, dated Feb. 17, 2015.
Annau et al., U.S. Appl. No. 13/873,376, filed Apr. 30, 2013.
Non-Final Office Action from U.S. Appl. No. 13/873,376, dated Feb. 24, 2015.
Annau et al., U.S. Appl. No. 13/873,393, filed Apr. 30, 2013.
Non-Final Office Action from U.S. Appl. No. 13/873,393, dated Feb. 24, 2015.
Final Office Action from U.S. Appl. No. 13/873,393, dated Jul. 27, 2015.
Annau et al., U.S. Appl. No. 13/873,430, filed Apr. 30, 2013.
Google, Search as you Type, Google Project Hosting, retrieved on Aug. 10, 2015 from https://code.google.com/p/search-as-you-type, Oct. 10, 2007, 2 pages.
Contoleon, A. "Blekko's Customisable Social Search Experience," Blog posting on Contoleon.com, Oct. 29, 2010, pp. 1-5.
Relevance, "New Search Engine Puts Spin on Things: Blekko," Relevance.com, Aug. 26, 2010, 2 pages.
Office Action from Chinese Application No. 201180063792.1, dated Jun. 11, 2015.
Non-Final Office Action from U.S. Appl. No. 13/873,349, dated Jan. 5, 2016.
Office Action from Chinese Application No. 201180063792.1, dated Dec. 9, 2015.
PCT International Search Report of PCT/US11/58674; dated May 4, 2012.
PCT Written Opinion of the International Searching Authority of PCT/US11/58674; dated May 4, 2012.
PCT International Preliminary Report on Patentability of PCT/US11/58674; dated Apr. 30, 2013.
Liu et al., "Application of Key Words Recommendation Based on Apriori Algorithm in Theme-Oriented Personalized Search," PR & AI, vol. 19, No. 2, Apr. 2006, pp. 1-11 (16 pages).
Wang, Y., "Internet Search Engine Tips," Shaanxi Province Information Center, Henan Science & Technology, 2010, p. 95 (3 pages).
Shen, J., "Introduction of major foreign patent websites and searching techniques thereof," Internet Fortune, Jun. 2009, pp. 196-197 (9 pages).
Final Office Action from U.S. Appl. No. 13/873,349, dated May 2, 2016.
Office Action from Chinese Application No. 201180063792.1, dated Mar. 11, 2016.
Examiner's Answer to Appeal Brief from U.S. Appl. No. 13/873,393, dated May 10, 2016.
Notice of Allowance from U.S. Appl. No. 13/873,376, dated Feb. 9, 2016.
Non-Final Office Action from U.S. Appl. No. 13/873,349, dated Sep. 1, 2016.
Patent Board Decision on Appeal from U.S. Appl. No. 13/873,393, dated Jun. 14, 2017.
Arrington, M. "TechCrunch Review: The Blekko Search Engine Prepares to Launch," https://techcrunch.com/2010/07/19/techcrunch-review-the-blekko-search-engine-prepares-to-launch/, Jul. 19, 2010, 5 pages.
Notice of Allowance from U.S. Appl. No. 13/873,393 , dated Aug. 30, 2017.
Advisory Action from U.S. Appl. No. 13/873,349, dated Mar. 24, 2017.
Final Office Action from U.S. Appl. No. 13/873,430, dated May 18, 2017.
Non-Final Office Action from U.S. Appl. No. 131873,430, dated Dec. 6, 2016.
Final Office Action from U.S. Appl. No. 13/873,349, dated Jan. 10, 2017.
Extended European Search Report and Search Opinion from European Application No. 11837269.7, dated May 23, 2017.
Examiner's Answer to Appeal Brief from U.S. Appl. No. 13/873,349, dated Jul. 25, 2017.
Non-Final Office Action from U.S. Appl. No. 15/135,457, dated Jul. 27, 2018.
Notice of Allowance from U.S. Appl. No. 13/873,430, dated Feb. 16, 2018.

(56) References Cited

OTHER PUBLICATIONS

Corrected Notice of Allowance from U.S. Appl. No. 13/873,430, dated Mar. 29, 2018.
Office Action from Chinese Application No. 201610293982.7, dated Dec. 4, 2018.

* cited by examiner blekko no new messages greg
> create a slashtag
> global chatter
> find slashtags

♺ Tweet  ⊞ Like  ⊞ chatter

▲ my slashtags
/not-in-hpc
/not-in-linux
/oly

▼ following

◆ most popular modify this column file bugs here
click here to report a bug with blekko
+ file a bug

602 — tofurky

604 {
tofurky
tofurky /food
tofurky / vegetarian
tofurky /animal-rights
tofurky jurky
tofurky recipes
tofurky recipes /food
tofurky recipes /vegetarian
tofurky recipes /animal-rights
tofurky.com
} search 🔍 sort results by:
/relevance ▶ ebsites | editors
seo   delete

| # | | | |
|---|---|---|---|
| 1 | twitter.com/supercomputing<br>Twitter<br>added by greg on Oct 3, 2010 4:10:12 PM | site | 12030.79 |
| 2 | hp.com/techservers<br>Messenging banner<br>added by greg on May 27, 2010 5:50:45 PM | site | 2876.38 |
| 3 | redhat.com/hpc/<br>redhat.com | The World's Open Source Leader<br>added by greg on Oct 29, 2010 1:06:50 AM | site | 2060.87 |
| 4 | theregister.co.uk/hardware/hpc/<br>The Register - Sci/Tech News for the World<br>added by greg on May 28, 2010 1:08:10 PM | site | 1717.60 |
| 5 | sgi.com/<br>SGI - HPC, Servers, Storage, Data Center Solutions, Cloud Computing<br>added by greg on Oct 28, 2010 10:28:39 AM | site | 1362.42 |
| 6 | ornl.gov/<br>Oak Ridge National Laboratory<br>added by greg on Oct 28, 2010 10:27:13 AM | site | 1349.63 |
| 7 | aws.amazon.com/hpc-applications/<br>Amazon Web Services<br>added by greg on Oct 29, 2010 1:14:19 AM | site | 1102.94 |
| 8 | blogs.sun.com/hpc/<br>blogs.sun.com<br>added by greg on Oct 29, 2010 1:04:03 AM | site | 1093.00 | help   prefs   logout blekko
editor in chief
associate editors:
edit slashtag

FIG. 6

FIG. 8 blekko no new messages
greg
- create a slashtag
- global chatter
- find slashtags

Tweet | Like

▲ my slashtags
/not-in-hpc
/not-in-linux
/oly

• following
• most popular modify this column file bugs here
click here to report a bug
with blekko
• file a bug /view /blekko/liberal
☐ search with /blekko/liberal blekko: /liberal 🔊 ⬚ ✚
all about liberal

| urls / tags 72 | followers 7 | activity 2 | editors 2 | | search 🔍 | sort results by:
/relevance ▼ add more websites | editors

| no. | url, title, date added | | site | rank | seo | delete |
|---|---|---|---|---|---|---|
| 1 | commondreams.org/<br>Common Dreams \| News & Views<br>added by tagbot on Mar 22, 2010 8:38:47 PM | | site | 1657.58 | 🗔 | ☐ |
| 2 | huffingtonpost.com/<br>Breaking News and Opinion on The Huffington Post<br>added by cheralyn on Aug 2, 2010 2:49:34 PM | | site | 1232.05 | 🗔 | ☐ |
| 3 | motherjones.com/<br>Mother Jones - Smart, Fearless Journalism<br>added by tagbot on Mar 22, 2010 8:38:47 PM | | site | 1197.06 | 🗔 | ☐ |
| 4 | thenation.com/<br>The Nation \| Unconventional Wisdom Since 1865<br>added by tagbot on Mar 22, 2010 8:38:47 PM | | site | 1172.06 | 🗔 | ☐ |
| 5 | alternet.org/<br>Alternet \| Home<br>added by tagbot on Mar 22, 2010 8:38:47 PM | | site | 1035.50 | 🗔 | ☐ |
| 6 | democrats.org/<br>The Democratic Party<br>added by tagbot on Mar 22, 2010 8:38:47 PM | | site | 1018.75 | 🗔 | ☐ |
| 7 | michaelmoore.com/<br>MichaelMoore.com<br>added by tagbot on Mar 22, 2010 8:38:47 PM | | site | 994.01 | 🗔 | ☐ |
| 8 | prospect.org/<br>The American Prospect \| Home<br>added by tagbot on Mar 22, 2010 8:38:47 PM | | site | 839.05 | 🗔 | ☐ |

• • • help  prefs  logout blekko
editor in chief
associate editors:

❥ apply to be an editor blekko　　　foo /oly　　　　　　　　　　　　　　　　　　　search 🔍　　　　/greg/oly edited by no new messages greg
› create a slashtag
› global chatter
› find slashtags 🔄 Tweet　👍 Like　　📣 chatter

• my slashtags
  /not-in-hpc
  /not-in-linux
  /oly

• following

• most popular modify this column file bugs here
click here to report a bug with blekko
+ file a bug left column settings　　　　　　　　　　　　　　　　　　　　　　　　　　　　　　　　　　　　❌
☑ my slashtags　☑ most popular　☑ suggested　☐ api

| slashtags I've created | slashtags I'm following |

☐ /darwin-awards　　☐ /fail　　　☐ /gut
☐ /hot　　　　　　　☐ /mars　　☑ /not-in-hpc
☑ /not-in-linux　　 ☑ /oly　　　☐ /snopes
☐ /wii　　　　　　　☐ /wkthist ☐ auto populate slashtags I create and follow.

searching for. Finding people has never been easier. Have you lost someone specials foo.com 3.  Foo Fighters - Dave Grohl
    tag | seo links cache ip chatter | spam
    News, touring information, store, multimedia, concert chronology, articles, interviews, discography, image gallery, and a discussion board. Official site for the rock band Foo foofighters.com 4.  forgetfoo. it's just a pixel, baby
    tag | seo links cache ip chatter | spam
    May the FOO forever prosper plus, it's just a kickass site. Candice Gets Naked. Beware of Photoshop. I do believe it's been awhile since the last BvB around here, so here's a quickie forgetfoo.com 5.  foo
    tag | seo links cache ip chatter | spam
    Term of disgust. Used very generally as a sample name for absolutely anything, esp. First on the standard list of metasyntactic variable is used in syntax examples. When 'foo' is used in catb.org/~esr/jargon/html/foo.html 6.  Foo Fighters on MySpace Music - Free Streaming MP3s, Pictures & Music
    tag | seo links cache ip chatter | spam
    Foo Fighters' official MySpace page with photos, music downloads, blog entries, and a chance for fans to post messages to the band. Latest Blog Entries. 19 minutes ago from myspace.com/foofighters greg
editor in chief

～930 help   prefs   logout

FIG. 10D blekko no new messages greg
- create a slashtag
- global chatter
- find slashtags

[Tweet] [Like] [chatter]

* my slashtags
/crunchbase1
/hot-in-hpc
/hot-in-linux
/bly
* following
* most popular modify this column file bugs here
click here to report a bug
with blekko
+ file a bug /chatter [/global] — 1048    search 🔍    help  prefs  invites (758)  logout 46 minutes ago greg deleted a website from /greg/crunchbase1
> myspace.com 49 minutes ago meuandthelot added the slashtag /meuandthelot/defense 3 hours ago chuck-mcmanis added a website to /chuck-mcmanis/spam
> guillotinepapertrimmer.com 3 hours ago krishna added an editor to /krishna/yc-startups
> accepted mike as coeditor 5 hours ago blekko added a website to /blekko/conservative
> www.republicanguru.com 5 hours ago keith added a website to /keith/blekko
> www.ginyu.com 5 hours ago greg added a website to /greg/spam
> www.ehow.co.uk 6 hours ago meuandthelot added the slashtag /meuandthelot/sheeple 6 hours ago krishna added a slashtag to /krishna/startups
> /krishna/dreamit-startups

BOOSTED SLASHTAGS

CROSS-REFERENCE TO RELATED APPLICATIONS

This patent application claims priority from and is related to International application no. PCT/US11/58674 filed Oct. 31, 2011, which claims priority from U.S. provisional applications 61/408,606 filed Oct. 30, 2010; 61/420,267 filed Dec. 6, 2010; and 61/488,112 filed May 19, 2011, which are hereby incorporated by reference in their entirety. This application is additionally related to International application no. PCT/US10/39395 filed Jun. 21, 2010, which claims priority from U.S. provisional application 61/218,889 filed Jun. 19, 2009, which are hereby incorporated by reference in their entirety. Finally, this application is additionally related to U.S. application Ser. No. 13/873,349 filed on Apr. 30, 2013 entitled "Search Query Transformations"; U.S. application Ser. No. 13/873,376 filed on Apr. 30, 2013 entitled "Dynamic Inference Graph"; U.S. application Ser. No. 13/873,393 filed on Apr. 30, 2013 entitled "Display of Dynamic Inference Graph Results"; and U.S. application Ser. No. 13/873,430 filed on Apr. 30, 2013 entitled "Display of Boosted Slashtag Results", which are hereby incorporated by reference in their entirety.

TECHNICAL FIELD

This application relates to the field of data processing and information retrieval in a computer network system, and, in particular, improving the relevance of search results generated by a search engine.

BACKGROUND

Search engines provide a powerful tool for locating content in documents and other information sources from a large database of information, such as information accessed on the Internet or World Wide Web (WWW), and/or the documents stored on the computers of an Intranet. Information may be retrieved in response to a search query, consisting of one or more words, terms, keywords and/or phrases that are submitted by a user. A goal of the search engine is to provide links to high quality, relevant results (e.g., web pages) to the user based on the search query. Typically, the search engine accomplishes this by matching the terms in the search query to documents and other information sources retrieved from the database.

As search query methods have evolved, more search results are cluttered with information that may affect the quality of the search result. The usefulness of a search engine depends on the relevance of the returned search result. Of the millions of web pages that are considered in a search query, some pages may be more relevant, popular, or authoritative than others. Furthermore, search results have become more manipulated to include undesirable information that accommodate interest associated with advertising, marketing, or other interests peripheral to the actual query. Consequently, web pages are becoming more tainted with sites that employ techniques such as spamdexing, link farming, keyword stuffing and article spinning, which degrade both the relevance of search results and the quality of the user-experience. Existing search engine methods lack flexibility for generating search results that overcome such encumbrances and that compromise search engine performance.

BRIEF DESCRIPTION OF THE DRAWINGS

For a better understanding of the subject matter described in this application, reference should be made to the Description below, in conjunction with the following drawings in which like reference numerals refer to corresponding parts throughout the figures.

FIG. 6 is a screenshot of a search request being entered in a search field by a user, according to some embodiments.

FIG. 8 is a screenshot example of a web browser for viewing a list of websites/URLs associated with a slashtag, according to some embodiments.

FIG. 9 is a screenshot illustration of a preference user interface for customizing various slashtag search features, according to some embodiments.

FIGS. 10A-E are screenshots illustrating various examples of user interfaces for customizing other features of slashtag searches, according to some embodiments.

FIG. 18 is screenshot illustration of how the search result of FIG. 17 may be modified when a /likes slashtag is included in the search query, according to some embodiments.

FIG. 20 is a screenshot example of another feature of the search interface, according to some other embodiments.

DESCRIPTION

Figure 1:
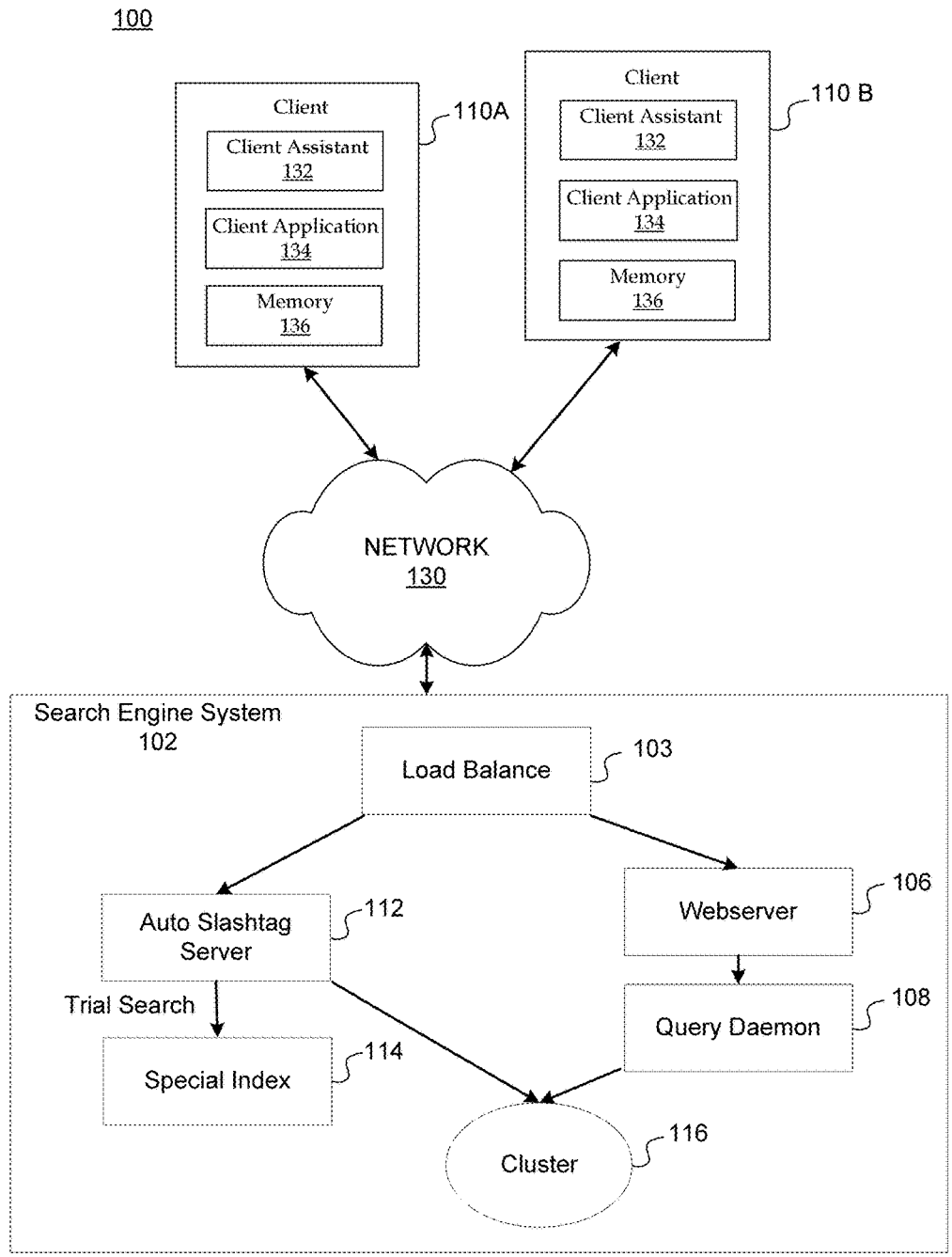
FIG. 1 is a block diagram of a network system according to embodiments.

Reference will now be made in detail to embodiments, examples of which are illustrated in the accompanying drawings. In the following description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of any invention(s) to these particular embodiments. In other instances, well-known data structures, timing protocols, software operations, procedures, and components have not been described in detail so as not to unnecessarily obscure aspects of the embodiments of the invention(s).

This disclosure relates to a method for processing content to be displayed in a web browser. The method comprises detecting at least one key word in a search query, generating an alternative search query, based on the at least one key word, the alternative search query including a search operator associated with the at least one key word, generating a first search result based on the alternative search query, and displaying the first search result in the web browser.

In the method, the search operator is a slashtag.

The method further comprises providing a link to select a second search result, the second search result being based on the at least one key word in the search query.

The method also comprises detecting a selection of the link to the second search result, generating the second search result based on the at least one key word in the search query, and displaying the second search result in the web browser.

Also in the method, the first search result and the second search result are displayed next to each other on the same web page.

Further in the method, each result item of the first search result or second search result comprises a two-line format, wherein the first line is dedicated to a page URL title that hyperlinks to the respective page URL, and the second line is dedicated to at least a subset of a group consisting of a website title, one or more content tags, one or more site tags, and an optional snippet.

In the method, the one or more site tags include, displayed at a web browser, at least a subset of a group consisting of: links, seo, rss, cache, source, ip, rank, hostrank, and adsense.

Also in the method, the one or more site tags include a social network indicator to enable a user to indicate a preference of the respective result item.

Further in the method, the social network indicators are a "likes" link and a "checkin" link.

In the method, the slashtag are a "/likes" slashtag and a "/checkin" slashtag.

Also in the method, the alternative search query is generated based on one or more intelligence criteria that adds or deletes a keyword in the search query.

Further in the method, the intelligence criteria includes at least one from a group consisting of: order and rank information associated with one or more search terms of the first search result, age of a document, frequency of hits or use of a document, user profile of a user providing the search query, user history of a user providing the search query, and geographic location.

In the method, the intelligence criteria are based on heuristics.

This disclosure also relates to a method for processing content to be displayed in a web browser. The method comprises detecting at least one key word in a search query, generating an alternative search query from the at least one key word, the alternative search query being based at least on computing an intermediary search of a plurality of characters from the at least one key word as the plurality of characters are being typed by a user, generating a first search result based on the alternative search query, and displaying the first search result in the web browser.

In the method, the alternative search query includes a slashtag.

Also in the method, the intermediary search is computed by compressing content of the intermediary search result, wherein compressing includes abbreviating and omitting parts of each entry in the intermediary search result.

Further in the method, the compressed content of the intermediary search result is computed by omitting URL path information.

In the method, the intermediary search is computed from a database of previously queried search results.

Also in the method, the intermediary search is computed by using autosuggest to guess the at least one key word as the plurality of characters are being typed by the user.

Further in the method, the intermediary search is computed simultaneously as the user types in the plurality of characters of the at least one keyword.

In the method, the intermediary search is computed using anchortext to replace one or more terms of content in the intermediary search result.

The method further comprises providing a link to select a second search result, the second search result being based on the at least one key word in the search query.

The method also comprises detecting a selection of the link to the second search result, generating the second search result based on the at least one key word in the search query, and displaying the second search result in the web browser.

Also in the method, the first search result and the second search result are displayed next to each other on the same web page.

This disclosure further relates to a method for processing content to be displayed in a web browser. The method comprises detecting at least one key word in a search query, generating an alternative search query, based on the at least one key word, the alternative search query including a search operator associated with the at least one key word, generating a first search result based on the alternative search query, and displaying the first search result in the web browser.

This disclosure relates to a method for generating a search result to be displayed in a web browser. The methods comprises detecting at least a search operator in a search query, the search operator being associated with a category of content from a social network site, in response to detecting the search query, generating a first search result based on at least the category of content associated with the search operator, and displaying the first search result in the web browser.

In the method, a plurality of search result items are ranked based on criteria that includes at least the category of content associated with the search operator.

Also in the method, the category of content is polling data collected from a plurality of users associated with the social network site.

Further in the method, the search operator are a "/likes" slashtag and a "/checkin" slashtag.

This disclosure also relates to a method for processing content to be displayed in a web browser. The method comprises detecting at least one search operator in a search query, detecting a boosting indicator associated with the at least one search operator, in response to detecting the boosting indicator, generating a first search result that includes a boosted ranking of at least a subset a plurality of search result items in the search result, and displaying the first search result in the web browser.

Also in the method, the subset of the plurality of search result items appears higher in rank in the generated search result.

Further in the method, the subset of the plurality of search result items are each associated with a boosted criteria.

In the method, the boosted criteria include criteria associated with a collection of opinions or reviews within a community.

Also in the method, the community is a platform for sharing and commenting about shared content.

Further in the method, the community is a platform for determining shared content based on expert opinions.

In the method, the boosted ranking is determined by a boost formula.

Also in the method, the boost formula accentuates the relevance of the subset of the plurality of search result items.

Further in the method, the boosted criteria includes at least one from a group consisting of popularity of a site, frequent hits to a site or document, frequently included in a search query, whether the site or document is fast stored.

In the method, the boosted criteria include criteria associated with polling data at one or more social network sites.

Also in the method, the boosted ranking of at least a subset a plurality of search result items in the search result includes as weight factor associated with each of search result items in the subset.

The method further comprises generating a second search result, the second search result being generated without the boosted criteria, and providing a link to select the second search result.

Further in the method, the first search result and the second search result are displayed next to each other on the same web page.

In the method, each result item of the first search result or second search result comprises a two-line format. The first line is dedicated to a page URL title that hyperlinks to the respective page URL and the second line is dedicated to at least a subset of a group consisting of a website title, one or more content tags, one or more site tags, and an optional snippet.

Also in the method, the one or more site tags include, displayed at a web browser, at least a subset of a group consisting of: links, seo, rss, cache, source, ip, rank, hostrank, and adsense.

Further in the method, the one or more site tags include a social network indicator to enable a user to indicate a preference of the respective search result item.

In the method, the search query further includes at least one other slashtag.

Also in the method, the boosting indicator associated with the at least one search operator includes a /history slashtag as the search operator, wherein the boosting indicator associated with the /history slashtag causes a boosted ranking of one or more websites viewed by a user in the past.

The method further comprises storing content associated with a user's viewing history with an encrypted key configured to be decrypted by an action by the user.

The method also comprises being configured to be decrypted by an action by the user includes decrypting the encrypted content each time that the /history slashtag is used.

The method comprises being configured to be decrypted by an action by the user includes decrypting the encrypted content each time the user logs in.

This disclosure relates to a search engine system. The search engine system comprises a load balancer configured to distribute and allocate workload in the search engine system, a slashtag server configured to generate an alternative search query, based on the at least one key word in a search query received from a user, the alternative search query including a slashtag associated with the at least one key word, and a web server configured to retrieve content from one or more nodes of at least one database cluster and to generate a first search result based on the alternative search query, the web server being further configured to display the first search result in a web browser.

This disclosure also relates to a search engine system. The search engine system comprises a slashtag server configured to detect at least one key word in a search query and generate an alternative search query from the at least one key word, the alternative search query being based at least on computing an intermediary search of a plurality of characters from the at least one key word as the plurality of characters are being typed by a user, and a web server configured to generate a first search result based on the alternative search query and display the first search result in a web browser.

This disclosure further relates to a search engine system. The search engine system comprises a slashtag server configured to detect at least one key word in a search query and generate an alternative search query, based on the at least one key word, the alternative search query including a search operator associated with the at least one key word, and a web server configured to generate a first search result based on the alternative search query and display the first search result in the web browser.

In addition, this disclosure relates to a search engine system. The search engine system comprises a slashtag server configured to detect at least a search operator in a search query, the search operator being associated with a category of content from a social network site, and a web server configured to, in response to detecting the search query, generate a first search result based on at least the category of content associated with the search operator, and display the first search result in a web browser.

Further, this disclosure relates to a search engine system. The search engine system comprises a slashtag server configured to detect at least one search operator in a search query and detect a boosting indicator associated with the at least one search operator, and a web server configured to, in response to the detected boosting indicator, generate a first search result that includes a boosted ranking of at least a subset a plurality of search result items in the search result and display the first search result in a web browser.

The search engine system further comprises a first storage and a second storage, each configured to interface with the web server, wherein the first storage is configured to store search engine index data, and wherein the second storage is configured to store a subset of search engine index data determined to be more important.

In the search engine system the second storage includes solid state disks.

FIG. 1 is a block diagram of a network system 100 according to embodiments. The system 100 includes one or more client devices 110A, 110B connected to a communication network 130 to communicate with a search engine system 102. The search engine system 102 answers queries made by users at client devices 110. Users may submit a search query consisting of one or more words, terms, keywords and/or phrases. Users may optionally specify search operators, which are used to specialize or refine the result beyond what are available using just keywords. The search engine server matches the search query to a database of information and retrieves information relevant to the query. Results are displayed with one or more of result URLs, content tags, site tags, and optionally a text snippet, providing links to documents and other information sources. The search operators are wrapped in a specific syntax, as will be described in further detail.

Client devices 110 can be any of a number of devices (e.g., a computer, an internet kiosk, a personal digital assistant, a mobile phone device, a gaming device, a desktop computer, a tablet, or a laptop computer). The client device 110 may include a client application 132, a client assistant 134, and/or client memory 136. The client application 132 can be a software application that permits a user to interact with the client device 110 and/or network resources via client device 110 to perform one or more tasks. For example, the client application 132 can be a web browser (e.g., for accessing a search engine) or other type of applications that permit a user to make search requests (e.g., submit search queries), browse content online, and/or access other resources (e.g., web pages and web services) located on search engine system 102. The resources at these nodes are accessible to the client device 110 via the communication network 130. The client assistant 134 can be a software application that performs one or more tasks related to monitoring or assisting a user's activities with respect to the client application 132 and/or other applications. For instance, the client assistant 134 assists a user at the client 110 with browsing for resources (e.g., files) hosted by websites; processes information items (e.g., search results) generated by search engine system 102; and/or monitors the user's activities on search results. In some embodiments, the client assistant 134 is part of the client application 132, available as a plug-in or extension to the client application 132 (provided, for example, from various online sources), while in other embodiments the client assistant 134 is a stand-alone program separate from the client application 132. In some embodiments the client assistant 134 is embedded in one or more web pages or other documents downloaded from one or more servers, such as the servers of cluster 116. Client memory 136 can store information such as web pages, search results received from the search engine system 102, system information, and/or information about a user.

In other embodiments, the client application 132 may be a mobile application on a mobile device that enables a user to access web pages on a web browser viewed on the user's mobile device.

The search engine system 102 processes a search query submitted at client 110, generates search results in accordance with the search query, and returns the results to the client 110. Search engine system 102 may include one or more servers or clusters of servers (e.g., 116) that store, manage, and retrieve a large number of indexed documents retrieved from different websites or content locations.

The search engine system 102 includes a load balancer 103, for distributing workload in the search engine system 102 in order to get optimal resource utilization, maximize throughput, minimize response time, and avoid overloading. The search engine 102 further includes a webserver 106 and query daemon 108 for responding to a search query from a user at client device 110. The webserver 106 and query daemon 108 retrieve content from one or more nodes in one or more clusters 116 that stores and maintains data. The search engine system 102 additionally includes an auto-slashtag server 112 for generating alternative search results when search queries are received. Alternative search results may be generated, as the name suggests, in an automated manner using algorithms. In some embodiments the search results are generated based on manual selection/input, and in other embodiments the results may be generated by a combination of manual and automated features. These functionalities will be further described in later sections.

Alternative search results may be or may include search operators, such as slashtags, which are wrapped into a specific syntax recognized by the database structures previously described, and any other database systems configured to use such search operators. Slashtags may be search operators where a user appends any query with the "/" character and then the selected operator. In some embodiments, the slashtag determines a search category, that may be assigned in an automated manner or that may be manually assigned. In some embodiments, the selected operator may be a key word.

The auto-slashtag server 112 may additionally consult a special index 114 that allows for trial searches in order to generate alternative search results, as will be described in detail. The special index 114 allows for the auto-slashtag server 112 to fast store and retrieve data for generating alternative search results. It will be appreciated that any part of the search engine system 102 may be executed on different devices and/or at different locations. For example, one or more operations of the load balancer 103, webserver 106, query daemon 108, and auto-slashtag server 112 may be, in whole or in part, combined to be executed on the same device, separate devices, or a combination of more than one device.

The communication network 130 can be any wired or wireless local area network (LAN), metropolitan area network, and/or wide area network (WAN), such as an intranet, an extranet, or the Internet, or it may be a combination of such networks. It is sufficient that the communication network 130 provides communication capability within the search engine system 102 (e.g., between clusters and/or nodes of servers and data storage units), and between the search engine system 102 and client devices 110. The communication network 130 may use any networking protocol. For example, communication network 130 may use the HyperText Transport Protocol (HTTP) to transport information using the Transmission Control Protocol/Internet Protocol (TCP/IP). The HTTP permits client computers to access various documents available via the communication network 130. The various embodiments of the invention(s), however, are not limited to the use of any particular protocol. The term "document" as used throughout this specification refers to any piece of information or service that is identified, stored, retrieved or located by the search engine system 102, and can be, for example, a web page, a file of certain format, a database record, audio, video content, an image, a computational object, or other information items.

Figure 2:
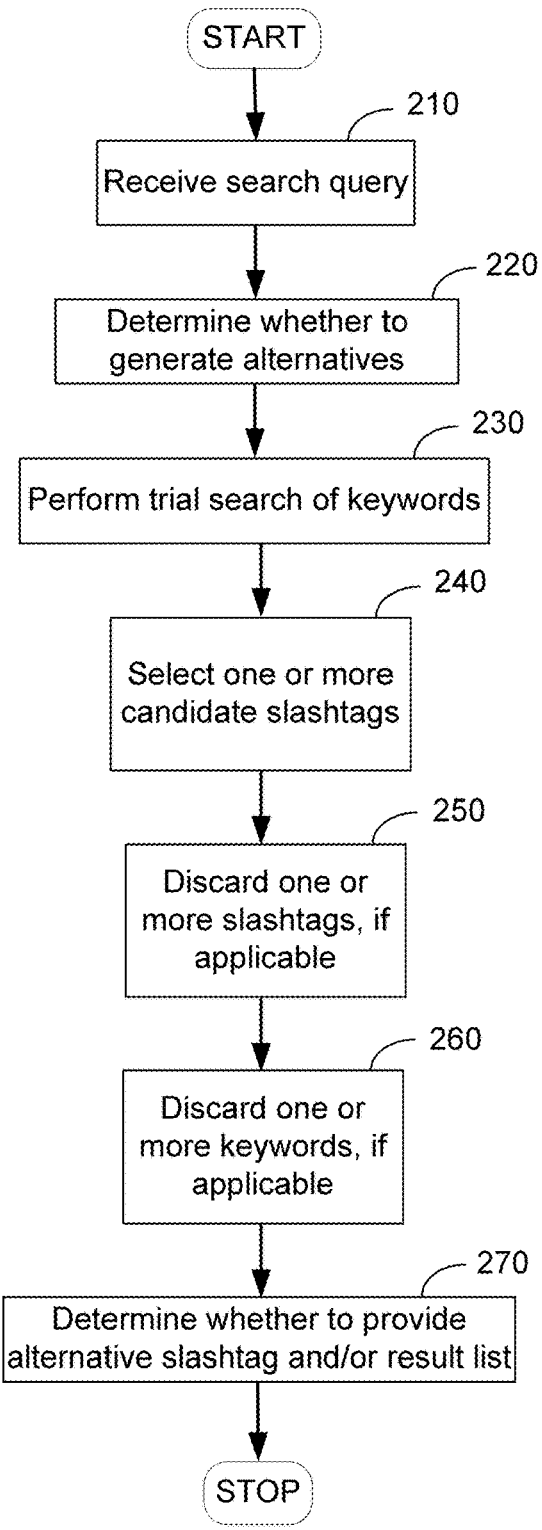
FIG. 2 is a flow diagram for processing a search query to generate alternative results according to some embodiments.

FIG. 2 is a flow diagram for processing a search query to generate alternative results according to some embodiments. The auto-slashtag server 112 generates user provided search queries into alternative queries using one or more different intelligence criteria that adds or deletes search keywords according to the subject of the search query, context, and the quality of results that match the query. Other criteria may also be considered such as the order and rank of the search results, the age of one or more documents, frequency of hits or use, user profile, user history, geographic location and so on. In some embodiments, the intelligence criteria may be based on heuristic methods that allow the determination of alternative queries to evolve based on patterns, history, user behavior, and so on. In other embodiments, manually generated list of transformations may be considered, as will be further described.

Many users will perform a search by typing a few keywords into a box or text-enabled field, not thinking about what search engine features, such as the use of slashtags (or other search operators), might improve their search. To aid these users in getting better results, an algorithm is utilized to generate alternative search results which contain different keywords and/or slashtags, but that are related to the initial search query. Such algorithm may be executed as the auto-slashtag server 112 of FIG. 1.

As an example, consider the search keywords [kung pao chicken]. The search engine system 102 may already include slashtag "/recipes" which contain a selection of high-quality recipe websites. The user may not use "/recipes," but the auto-slashtag server 112 may determine that the collection of websites associated with "/recipes" may be relevant to the query and that many of the results for [kung pao chicken] would be labeled as recipe websites. In some embodiments, the determination is based on criteria considered by the auto-slashtag server 112, such as the results of a trial search of the original terms [kung pao chicken]. Subsequently, an alternative search of [kung pao chicken /recipes] is generated by running an alternate search based on the auto-slashtag generated search query, and the alternate results are presented to the user. The alternate results may be presented to the user in any number of ways, such as a replacement of the initial search or would-be search, displayed parallel to the initial search, as an optional link to the alternate result list, and so on.

The auto-slashtag server 112 may generate more than one alternate search query or different types of alternate searches based on different combinations of keywords and/or slashtag operators, each of which may produce more than one search result list that the user may select to view. The original user search query may, for example, be altered by adding or deleting search keywords:

Example: [the the]→[the the/music]

Or by adding a slashtag and also possibly adding deleting search keywords:

Examples: [tofurky recipe]→[tofurky /recipe]
[kung pao chicken]→[kung pao chicken /recipe].

In some embodiments, the alternatives may be generated by using a manually-generated list of transformations. Manually-generated list of transformations may be one or more rules that providing manually-generated instructions or instructions for considering a set or listing of slashtags that may be constructed based on user preferences, interests, or in any user-customized manner. An example rule is: "If a query contains the keyword 'recipe' or 'recipes', delete it and add the slashtag /recipe." This may improve recipe searches, but likely produces a poor alternative for the search [recipe for disaster]. A better rule is, "If the final keyword is 'recipe' or 'recipes', delete it and add the slashtag /recipe" since most users would type "recipe" at the backend of other food keywords in a query (e.g., kung pao chicken recipe).

Other methods for determining how alternative searches are generated may include the use of semantic analysis of the search keywords. If the search keywords look like a person's name [Bob Truel], the auto-slashtag server 112 may select "/people" as a candidate slashtag. If keywords look like a street address, "/map" may be selected as a candidate slashtag.

Referring back to FIG. 2, in some embodiments, the following computer algorithm may be utilized to generate alternative searches. Upon receiving a search query at step 210, the algorithm provides for determining whether or not to generate alternatives at Step 220. If the query is a single keyword or looks like a person's name, the decision may not choose to generate any alternatives.

At Step 230, a trial search of the keywords may be performed. The trial search uses keywords or the characters of terms as they are being typed by the user to conduct an intermediary search to assist in determining alternative search queries. There are a number of different ways that a trial search can be conducted.

One way to do the trial search is to do the search the normal way that searches are done on a search engine, e.g. producing the usual search engine results if autoslashtags were not in use. Although trial searches may be a normal search, this feature also allows for one or more combined features of an abbreviated, fast search by, for example: taking a normal posting list, and discard all but the certain entries for a given site to compress the posting list by disregarding all the URL paths; and use a database of previous query results to generate a faster search.

The trial search may be combined with a system where keyboard characters are sent to the server as the user types in keywords of a search query. The system may be a local system or may be a system external to the search engine system 102, such as one provided by a third party. The trial search is then made for every character that the user types, perhaps using autosuggest to guess what the completed search keywords might be. The benefit of these character-by-character trial searches is that the results of the trial search would be available more quickly when the user finishes entering search keywords and presses return or the "search" button. In other words, the trial search is simultaneously launched as the user types in characters of one or more keywords such that the trial search would be completed by the time the user has finished entering the one or more keywords. It will be appreciated, however, that a faster speed of trial search features may still be achieved even in instances where the user has completed entering a search request or keywords, i.e., the user hits "search" or the return key upon typing in a search request.

Another alternative for doing the trial search is to use a method of trial searching which is less resource intensive and returns an answer more quickly, say 10s of milliseconds instead of 100s. The speed of this feature allows for the execution of fast trial searches that may occur in real-time, simultaneously as the user is typing in characters of a search query. This abbreviated trial search (ATS) can be done in any number of ways, including one of the following ways:

ATS 1: Cut Down the Whole-Web Index

In some embodiments, the results from the trial search may be provided in abbreviated or shorthand form, for example the results from the trial search may be a list of result websites, and not the complete result URLs. This leaves an opportunity to use a much smaller than normal index to compute the trial search result. This smaller index can be computed by cutting down a complete search engine index. Such an index consists of a posting list for each search keyword. These posting lists contain a list of URLs and ranks for a given keyword. Since the auto-slash server 112 is only concerned with the websites for each keyword, in order to reduce the trial search operation, the URL path information may be disregarded or not considered. Then all the entries in a posting list for the same website may be combined. In this manner, the trial search is conducted quickly.

EXAMPLE

Before: posting list for keyword "Lindahl"
url=www.pbm.com/~lindahl/home.html, rank=1000
url=www.pbm.com/~lindahl/about_me.html, rank=900
url=en.wikipedia.com/wiki/Greg_Lindahl, rank=40
After: abbreviated posting list for keyword "Lindahl"
host=www.pbm.com, rank=1900 (two entries combined into one)
host=en.wikipedia.com, rank=40

The abbreviated posting lists are much smaller, and searching using ATS 1 will be faster than a traditional search.

ATS 2: Use a Database of Previous Query Results

A second method of ATS includes not using the normal search index at all, but rather generating a new index from previous search results. This involves taking a large database of previous results which matches query keywords to a list of some sum number (e.g. 20) URLs. Then generating posting lists for these keywords pretending as if the contents of these URLs were the query keywords. For example, assume that there are only 2 searches with 2 URL results each:
 [dog food]=>en.wikipedia.org/wiki/Dog_Food, www.pbm.com/dog/food.html
 [cat food]=>en.wikipedia.org/wiki/Cat_Food, www.pbm.com/cat/food.html
The posting lists would be:
 [keyword cat]
 url=en.wikipedia.org/wiki/Cat_Food, rank=1
 url=www.pbm.com/cat/food.html, rank=1
 [keyword dog]
 url=en.wikipedia.org/wiki/Dog_Food, rank=1
 url=www.pbm.com/dog/food.html, rank=1
 [keyword food]
 url=en.wikipedia.org/wiki/Cat_Food, rank=1
 url=www.pbm.com/cat/food.html, rank=1
 url=en.wikipedia.org/wiki/Dog_Food, rank=1
 url=www.pbm.com/dog/food.html, rank=1
The same technique of ATS 1 may be used here of keeping only the hostnames and discarding URL path information. Thus:
 [keyword cat]
 url=en.wikipedia.org, rank=1
 url=www.pbm.com, rank=1
 [keyword dog]
 url=en.wikipedia.org, rank=1
 url=www.pbm.com, rank=1
 [keyword food]
 url=en.wikipedia.org, rank=2
 url=www.pbm.com, rank=2

This index may well be extremely small and fast. If any of these alternative indices fit into RAM or flash disk on a single node, a substantial time savings and resource reduction will exist.

ATS 3: An alternate use of previous query results (adding in additional words such as anchortext)

Another method extends ATS 2 to use additional keywords such as the anchortext for each URL in the index. For illustration purposes, assume that the URL www.pbm.com/dog/food.html has anchortext which includes the words "dog", "food", "treats", "click", and "here". First the anchortext keywords are winnowed to discard useless words like "click" and "here". Then additional entries are added or the rank of existing entries are increased in the posting lists for "dog", "food", and "treats". The resulting index is larger than ATS 2, but can have significantly better results.

Returning now to FIG. 2, at Step 240, candidate slashtags may be selected based on the results of the trial search. Given the results of the trial search, candidate slashtags may be selected to add to alternative searches. One method is to look at the top N best results. If these results mostly fall within a single slashtag, that slashtag is selected as a candidate. Alternately, some websites or URLs may be associated with tags by human interaction or algorithmically determined through some semantic analysis. As an example, a manually-generated list of recipe websites may be considered, or a computer algorithm previously written to guess if a given webpage is a recipe or not.

In both the manual and algorithm cases the most useful websites for selecting a candidate slashtag may be poor answers to the query, possibly webpages which have been heavily SEOed (search-engine optimized) for this topic. For example, for a health-related query, a "/health" slashtag may contain high-quality consumer-oriented health websites such as the Mayo Clinic website. Mayo's website has not been heavily SEOed and might not appear high in the results for a health-related query. But there are many bad websites (spam, or adsense-farms) such as mesothelioma.com, which is highly SEOed for the query keyword [mesothelioma]. The mesothelioma.com can be tagged as a health website either by hand or using a semantic algorithm. Then when a trial search comes up with mesothelioma.com in the top N results, this is an indication that the query keywords in the trial search are health-related. The health label may also be associated with the "/health" slashtag.

Having selected one or more candidate slashtags, the list may be winnowed, at Step 250, by discarding one or more of the candidate slashtags, as follows. If there are dissimilar slashtags on the list, such as both "/lyrics" and "/health", the decision may be that the query is incomprehensible and both "/lyrics" and "/health" may be eliminated as candidates. If there are similar slashtags on the list, such as both "/psychology" and "/health", both slashtag may be kept as candidates.

For each remaining slashtag candidate, a search alternative is generated, potentially adding or deleting some keywords from the search. For example, for the search [tofurky recipe], a single candidate slashtag "/recipes". At Step 260, one or more keywords may be dropped, if applicable. For example, keywords are dropped which are synonyms for the word 'recipe', leaving the alternative search as [tofurky /recipes] instead of [tofurky recipe /recipe]. If there are several slashtag candidates, each alternative search might have different keywords, each of which may be modified for redundancy, to place the alternative search in better form, and so on. Thus, at Step 270, the system determines whether to display the alternative slashtag and/or result list.

Figure 3:
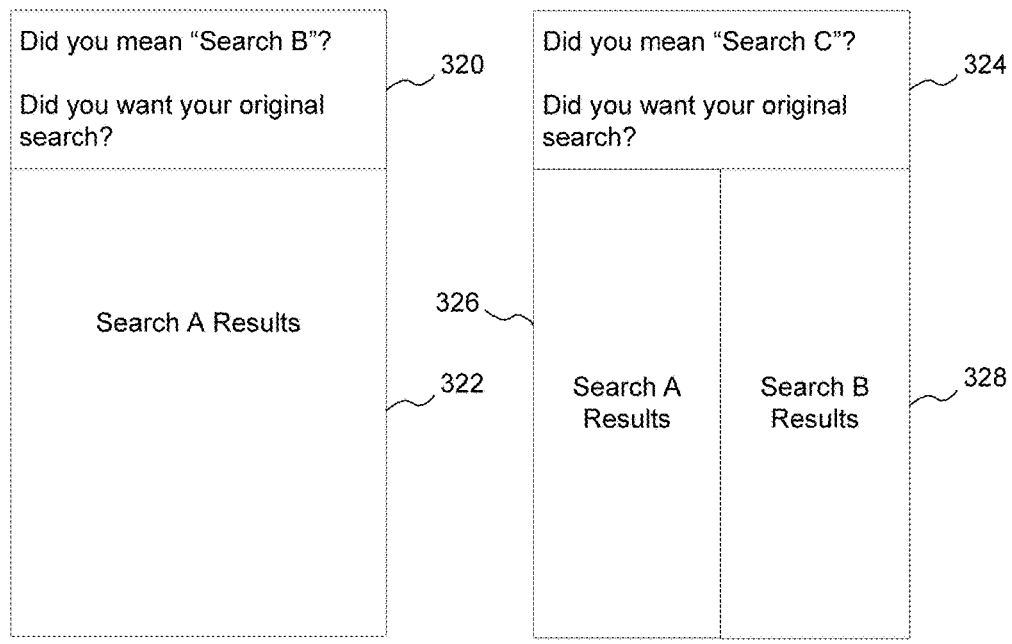
FIG. 3 is a block diagram illustrating the display of search results when alternative searches have been generated by the search engine system of FIG. 1, according to some embodiments.

FIG. 3 is a block diagram illustrating the display of search results when alternative searches have been generated by the search engine system 102 of FIG. 1, according to some embodiments. If there are one or more alternatives remaining, the one or more results may be presented to the user. This includes one or more actual sets of search results, and/or clickable links to other alternative searches. In a first optional display 320, the user may be presented with an optimal search result A 322, but may be given a series of options. The user may be provided with the question "Did you mean "search B"?" providing the user with an alternative search result. The user may also be given the option of selecting a link to the original search result in the question "Did you want your original search?"

If the search result(s) presented to the user do not include the original search, a clickable link, which will run the original search without any changed keywords and added slashtags, may be conducted. The auto-slashtag server 112 of FIG. 1 selects which result(s) to show based on how confident it determines that the alternative search will appeal to the user. For example, if a candidate slashtag is only weakly supported by the trial search, that slashtag may not be chosen and the corresponding alternative search may not be the only result displayed. In the case where there are more than one alternative search results, the results may be displayed in an ordered rank of importance or a subset of the best results displayed.

In another optional display 324, the two best search results, Search Result A 326 and Search Result B 328 may be presented to the user next to each other in a side-by-side manner. Alternatively, one of the search results 326, 328 may be the original search result and the other the best result. The display 324 may include links to additional search results as indicated by the question "Did you means "Search C"?" If neither Search Result A 326 or Search Result B 328 are the original result, the user may be prompted with a question "Did you mean your original search?" to provide a separate link to the original search.

In some embodiments, additional modifications may be made to the alternative searches. For example, if a user specifies "/recipes", then the user may find it acceptable to see only high-quality recipe website results. If the auto-slashtag server 112 has transformed [kung pao chicken] into the alternative [kung pao chicken /recipes], user satisfaction may be improved by adding additional result(s), such as result(s) from a generic knowledge website (such as Wikipedia or YouTube), or considering past preferences of the user. In the [kung pao chicken] example, the Wikipedia entry for Kung Pao Chicken has interesting information about the history and variants of Kung Pao Chicken, while the top YouTube result may be a video showing how to make Kung Pao Chicken. If there is a relevant navigational query result which is not in the "/recipes" slashtag (such as kungpaochicken.com), adding that result to the results may improve it. The user may manually add the result or it may be added based on popularity or frequency of being selected, by the user or other users.

If the alternative query returns poor results (i.e. too few results), these results are not chosen to be presented to the user. Such results may be demoted to one which is shown as a clickable link, or the alternative query results may be merged with the original query results.

Figure 4:
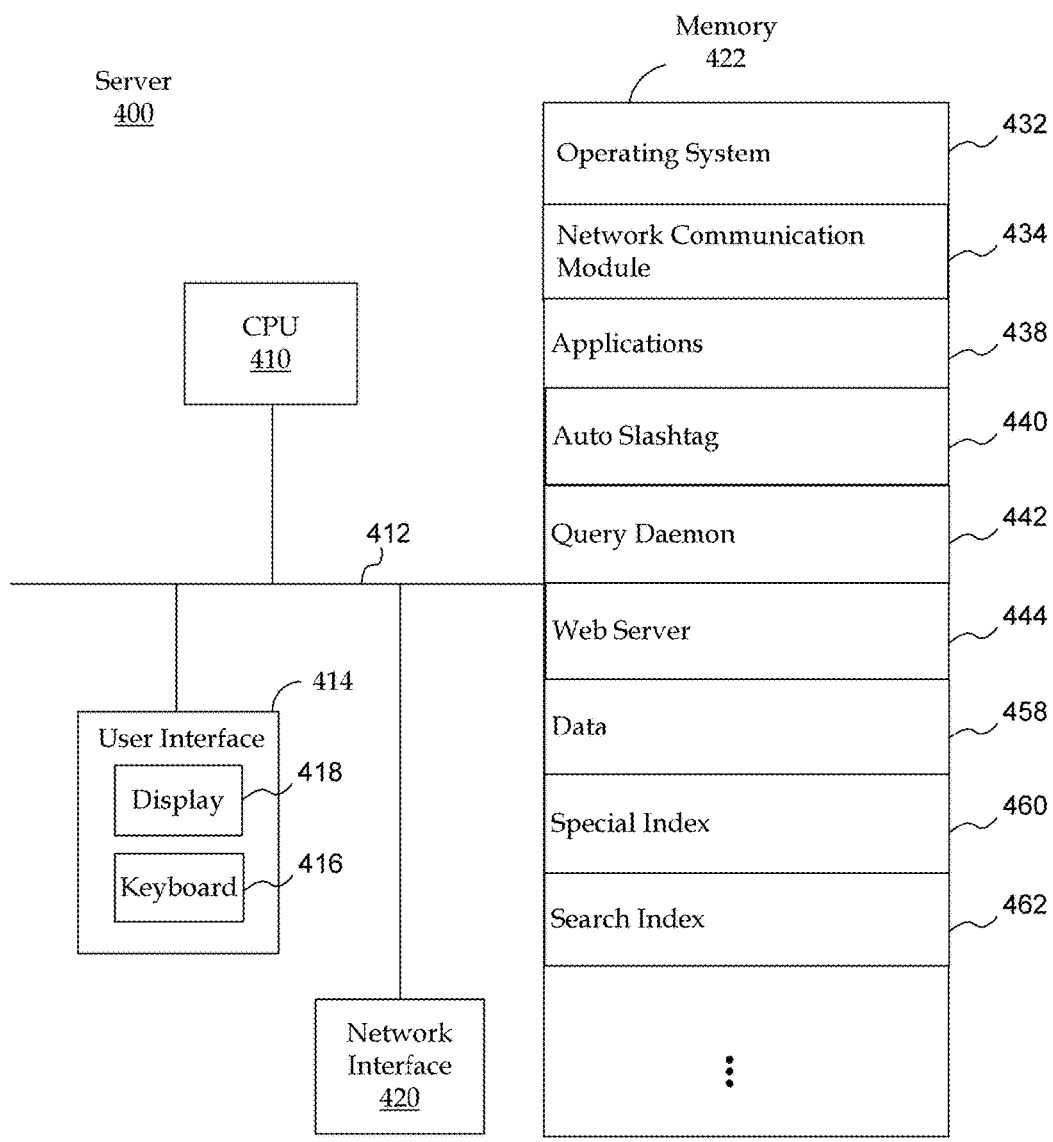
FIG. 4 is a block diagram illustrating an embodiment of a server system according to embodiments.

FIG. 4 is a block diagram illustrating an embodiment of a server system 400 according to embodiments. The server system 400 may include at least one data processor or central processing unit (CPU) 410, one or more optional user interfaces 414, a communications or network interface 420 for communicating with other computers, servers and/or clients, a memory 422 and one or more signal lines 412 for coupling these components to one another. The user interface 414 may have a keyboard/mouse 416 and/or a display 418. The one or more signal lines 412 may constitute one or more communications busses.

The memory 422 may include high-speed random access memory and/or non-volatile memory, such as one or more magnetic disk storage devices. The memory 422 may store an operating system 432, such as LINUX, UNIX or WINDOWS, that includes procedures for handling basic system services and for performing hardware dependent tasks. The memory 422 may also store communication procedures in a network communication module 434. The communication procedures are used for communicating with clients, such as the clients 110 (FIG. 1), and with other servers and computers.

The memory 422 may additionally include several applications for servers 400 to perform one or more methodologies discussed previously. Includes in the applications 438 may be an auto-slashtag module 440 that may be executed to generate alternate search results when a search query is received from a user at client devices 110. Included in the applications 438 may be a query daemon module 442 that performs searches either in response to receiving a search query or instructions from the auto-slashtag module 440 when executed. Applications 438 may also include a webserver 444 that delivers content, such as web pages, to client devices 110 in response to receiving search queries from the user and after other operations as prescribed by the methodologies previously described.

Memory 422 also includes data storage 458 to store data accessed and managed by applications 438 or applications at other servers and machines. Stored data includes a special index 460 that may store data for faster access, such as search results generated and processed during various types of trial searches previously described. Data storage 458 may also include a conventional search index 462 for conducting searches and retrieving content, as is well-known by those ordinarily skilled in the art.

FIG. 4 is intended more as a functional description of the various features which may be present in a distributed database system rather than as a structural schematic of the embodiments described herein. In practice, and as recognized by those of ordinary skill in the art, the functions of the server 400 may be distributed over a large number of servers or computers, with various groups of the servers performing particular subsets of those functions. Items shown separately in FIG. 4 could be combined and some items could be separated. For example, some items shown separately in FIG. 4 could be implemented on single servers and single items could be implemented by one or more servers. The actual number of servers in a distributed database system and how features are allocated among them will vary from one implementation to another, and may depend in part on the amount of information stored by the system and/or the amount data traffic that the system must handle.

Figure 5:
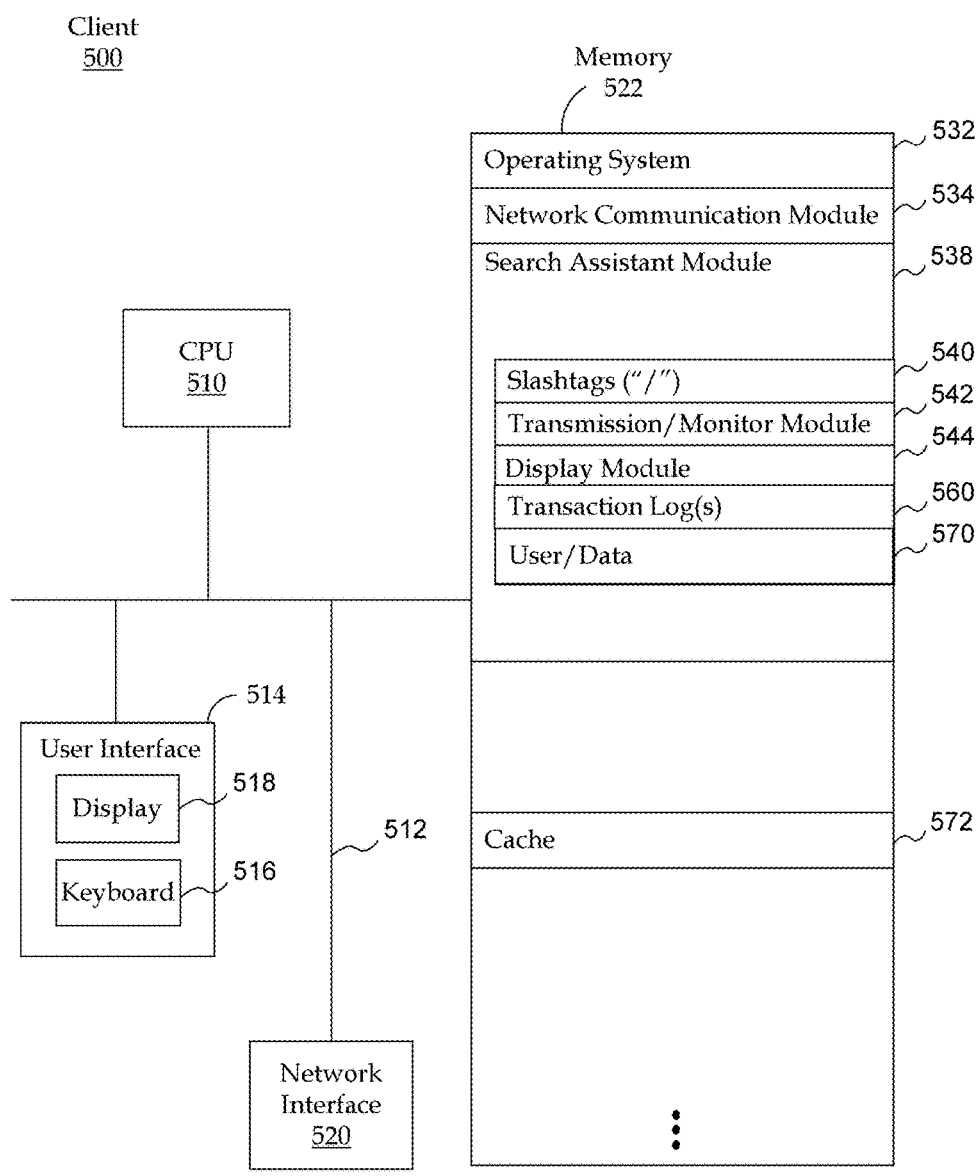
FIG. 5 illustrates a block diagram of an embodiment of a client system, according to some embodiments.

FIG. 5 illustrates a block diagram of an embodiment of a client system 500, that may include client devices 110 (FIG. 1), according to some embodiments. The client system 500 may include at least one data processor or central processing unit (CPU) 510, one or more optional user interfaces 514, a communications or network interface 520 for communicating with other computers, servers and/or clients, a memory 522 and one or more signal lines 512 for coupling these components to one another. The user interface 514 may have a keyboard/mouse 516 and/or a display 518. The one or more signal lines 512 may constitute one or more communications busses.

The memory 522 may include high-speed random access memory and/or non-volatile memory, such as one or more magnetic disk storage devices. The memory 522 may store an operating system 532, such as LINUX, UNIX or WINDOWS, that includes procedures for handling basic system services and for performing hardware dependent tasks. The memory 522 may also store communication procedures in a network communication module 534. The communication procedures are used for communicating with server(s) 400 (FIG. 4).

The memory 522 may also include a search assistant module 538, which may be a browser or browser module. The search assistant module 538 may include a user data 570 which may be generated much like a cookie that monitors user activities or it may be generated remotely based on content of one or more URLs visited or associated with a user or content site. The search assistant module 538 may also include a transmission/monitoring module 542 for monitoring user input or for sending a search query, a search results receipt module (not shown) for receiving search results and a display module 544 for displaying search results. The search assistant module 538 may additionally include instructions for utilizing slashtags ("/") 540 and display module 544 for displaying search results and other user provided or requested content. In embodiments where the client system 500 is coupled to a local server computer, one or more of the modules and/or applications in the memory 522 may be stored in a server computer at a different location than the user.

In some embodiments, memory 522 may additionally include a transaction log 560 for storing and/or maintaining user activity history or transaction history. Memory 522 may additionally include a cache 572 for additional storage.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 522 or 422 may store a subset of the modules and data structures identified above. Furthermore, memory 522 or 422 may store additional modules and data structures not described above.

FIG. 6 is a screenshot of a search request being entered in search field 602 by a user in accordance with previous embodiments described, according to some embodiments. As previously described, a trial search is being conducted on the back-end as the user types in "tofurky" in search filed 602. Before the user has completed entering the keywords in a search query, a list of possible keywords and/or alternate slashtags are presented to the user in list 604. For example, as the user types in the search query, one or more slashtags relevant to the query are suggested in list 604.

Figure 7:
FIG. 7 is a screenshot of a search result list, according to some embodiments.

FIG. 7 is a screenshot of a search result list, according to some embodiments. In this screenshot the user has completed entering the keywords of a search in a search request field 708 (e.g., "tofurky recipe") and a search result list 714 is presented to the user. Line 710 indicates that a trial search was conducted and an alternate search result, "tofurky /recipe" was generated and presented for viewing to the user. The alternate search result "tofurky /recipe" was generated in response to the user's input of key words "tofurky recipe" and additionally includes a relevant slashtag "/recipe". In some embodiments, extra words, like the extra keyword "recipe" in the example, may be deleted for improving efficiency or relevancy in presenting the final result search query "tofurky /recipe". In addition, the user is provided with an option to click a link 712 to a search result of the originally entered keywords "tofurky recipe" and to another alternate search query "tofurky recipe /recipe", which is likely less relevant than the provided search result list 714.

In addition to the various embodiments described above, the user interface, returning the various search results by search engine system 102 of FIG. 1, provides additional features for creating, storing, and managing slashtags that may be user generated, automatically generated, administratively generated, and/or created by other users to facilitate search results by search engine system 102, which will be described in further detail below.

FIG. 8 is a screenshot example of a web browser for viewing a search result list associated with the slashtag "/liberal". A user of the search engine can create a personal search engine account, which provides a number of personalized features for creating, storing, managing, and sharing slashtags and search features provided by search engine system 102. These customized features and preferences may be considered when search queries are conducted. For example, once a user Greg has logged into his account, he has the ability to create and manage slashtags and associate content to such slashtags via personal slashtag feature box 822. Greg may also view activity related to slashtags he has created in "my slashtag" 824. Additionally, Greg is also able to follow the activity of a selection of slashtags (which may be created by him or by others) or the most popular slashtags in lists 826. It will be appreciated, that the lists 826 may be expanded and collapsed using known techniques, as indicated by the triangular icons located next to each list category "following" or "most popular." Further, the lists 826 may include other list categories not shown.

In the example of the screenshot in FIG. 8, the search result list 820 may be based on user's own preferred list 820 that user has added to user-created slashtag /liberal, or it may be automatically generated, and/or generated by the search engine system 102 to automatically created slashtag /liberal. In other embodiments, the list 820 may be a compilation of websites selected by a combination of user preferences, automatically associated, or preferences by others.

The screenshot example in FIG. 8 additionally includes an editor's region 828. The editor's region 828 includes a link to the editor in chief in charge of editing content and monitoring the editing community of a particular search category or one or more slashtags. The editor's region 828 also includes one or more associate editors with authorization to edit content of the particular category or one or more tags associated with the search result displayed. The associate editors may comprise of editors from private or public sectors or a combination of both. Associate editors may also be selected based on an application process, which can be accessed by members of the public via "apply to be an editor" link in the editor's region 828.

FIG. 9 is a screenshot illustration of a preference user interface 930 for customizing the preferences of various left column features of slashtag searches, such as my slashtags, following, suggested slashtags, most popular, and so on. The preference interface 930 includes one or more subfolders of slashtags that a user, such as user Greg, may monitor. The list of slashtags may include customized slashtags that user Greg created, slashtags created by others, such as by Friends of Greg, and automatically generated slashtags that Greg has selected.

Figure 10A:
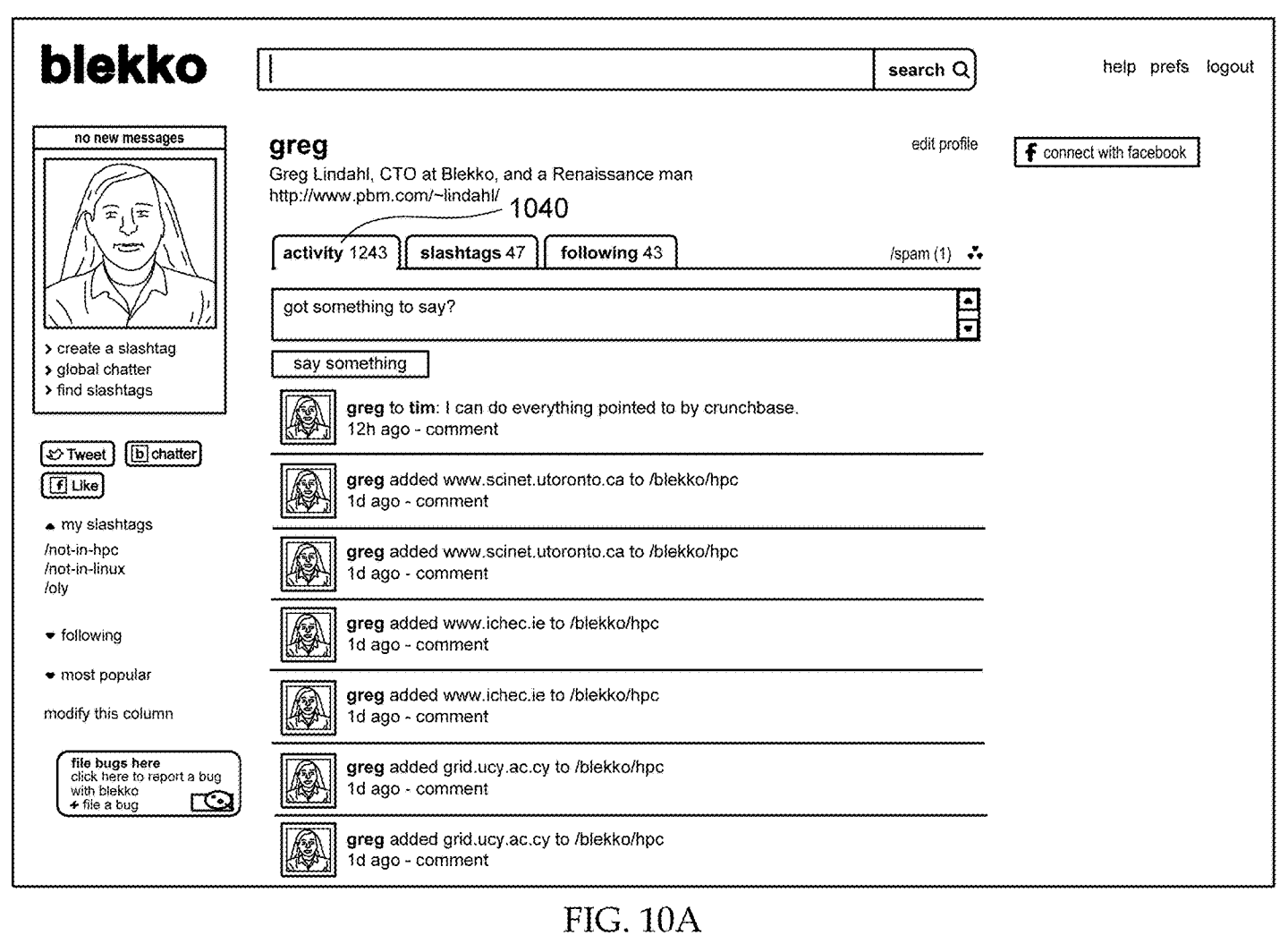

FIG. 10A is a screenshot illustration of an activity tab 1040, which is one of the features in the personal slashtag feature box 822. The personal feature box 822 provides user feeds on user's activity in creating and managing slashtags, and includes both comments and website edits, which are relevant to that particular user. For example, slashtag edits for any slashtag that the user can edit or follow is displayed. Additionally, comments are displayed, which are to the user or from the user or about the user's edited or followed slashtags.

Figure 10B:
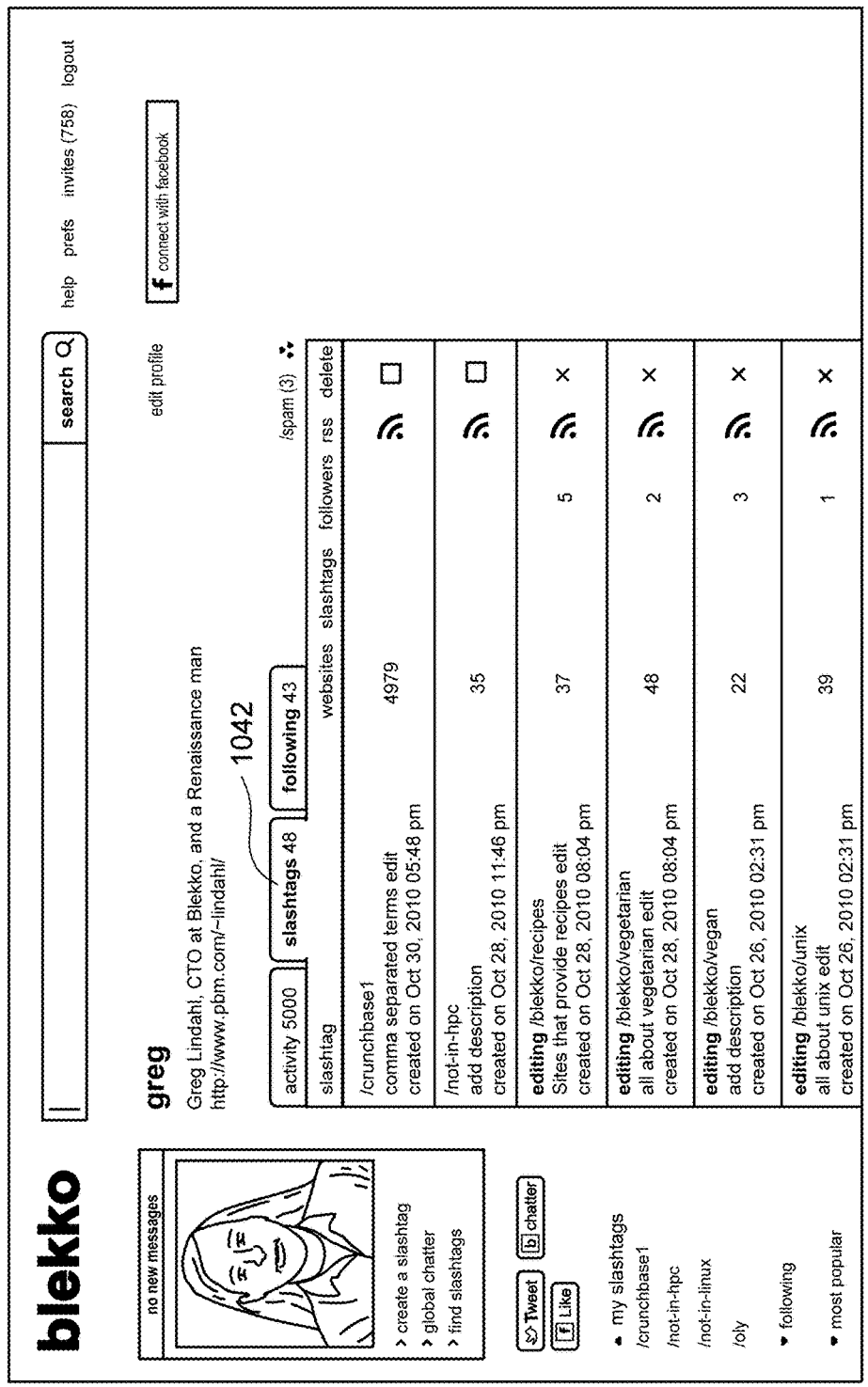

FIG. 10B is a screenshot illustration of a user's slashtag tab 1042, which is one of the features in the personal slashtag feature box 822. The slashtag tab 1042 displays a list of slashtags the user has created, may edit, or has authorization to edit. Each slashtag may have an associated creation date, short description, and/or status information (e.g., editing). Each slashtag entry additionally includes the number of websites associated with the slashtag, other associated slashtags, the number of followers, rss feeds, and an option to delete the tag from the list, all of which will be described in detail in later sections.

Figure 10C:
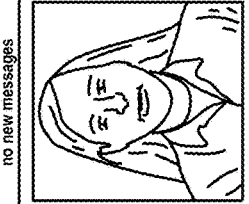

FIG. 10C is a screenshot illustration of a user's following tab 1044, which is another one of the features in the personal slashtag feature box 822. In this tab, the user may add and delete slashtags the user would like to follow or keep updated on to monitor modifications to these slashtags. In addition, the personal slashtag feature box 822 may include an additional tab (not shown) for following another user's activity or list of users' activities and their changes to slashtags and/or comments.

A /spam indicator 1045 may also be displayed that indicates the number of /spam websites in the user's personal /spam slashtag. For example, according to the /spam (3) indicator 1045 on Greg's user interface, Greg has so far designated three websites as being spam. The /spam list may be accessed via slashtag tab 1042, or the user's personal interface may include an additional "spam" tab (not shown).

Figure 10D:
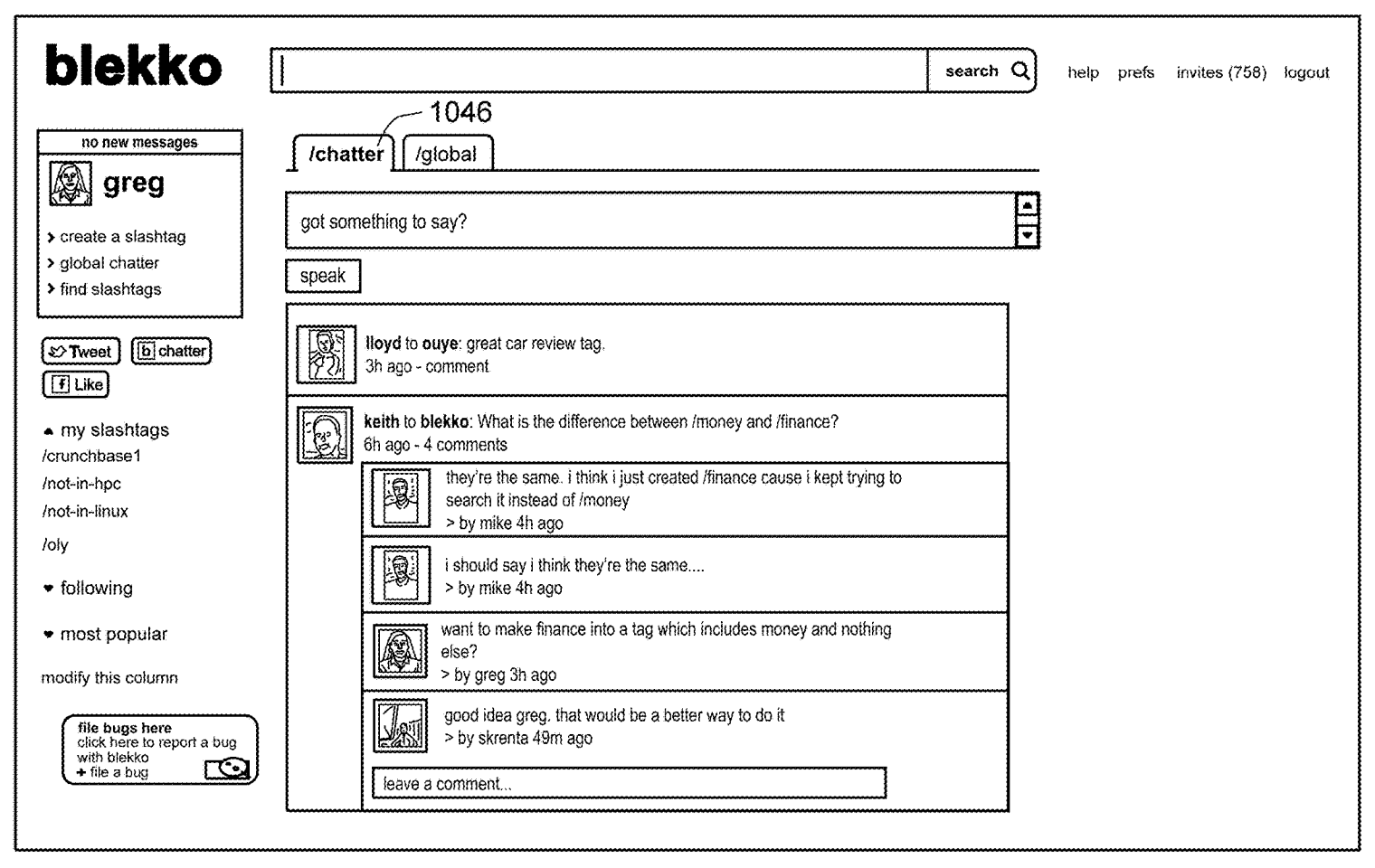

FIG. 10D is a screenshot illustration of a user's /chatter tab 1046, which is another one of the features in the personal slashtag feature box 822. The /chatter tab 1046 provides status updates of users and comments from users about posted comments, edits, websites, URLs, slashtags, and other content.

FIG. 10E is a screenshot illustration of a user's /global chatter tab 1048, which is another one of the features in the personal slashtag feature box 822. The /global tab 1048 is a date/time sorted list of the most recent slashtag edits.

Figure 11:
FIG. 11 is a screenshot illustration of a search result list that includes items considered spam or that a user may regard as spam, according to some embodiments.

FIG. 11 is a screenshot illustration of a search result list 1150 that includes items considered spam or that a user may regard as spam. When a user is logged in, the negation of the /spam slashtag may be added to every search. This eliminates any item in a search result list that has been designated as spam by the user. Websites that are spam or that the user determines are spam can be quickly added to the /spam slashtag by clicking the "spam" link 1152 associated with each search result item. When invoking the negation of the /spam slashtag to a search result list, those items designated as spam will be removed from the search list and an updated search list is presented to the viewer (not shown).

Figure 12:
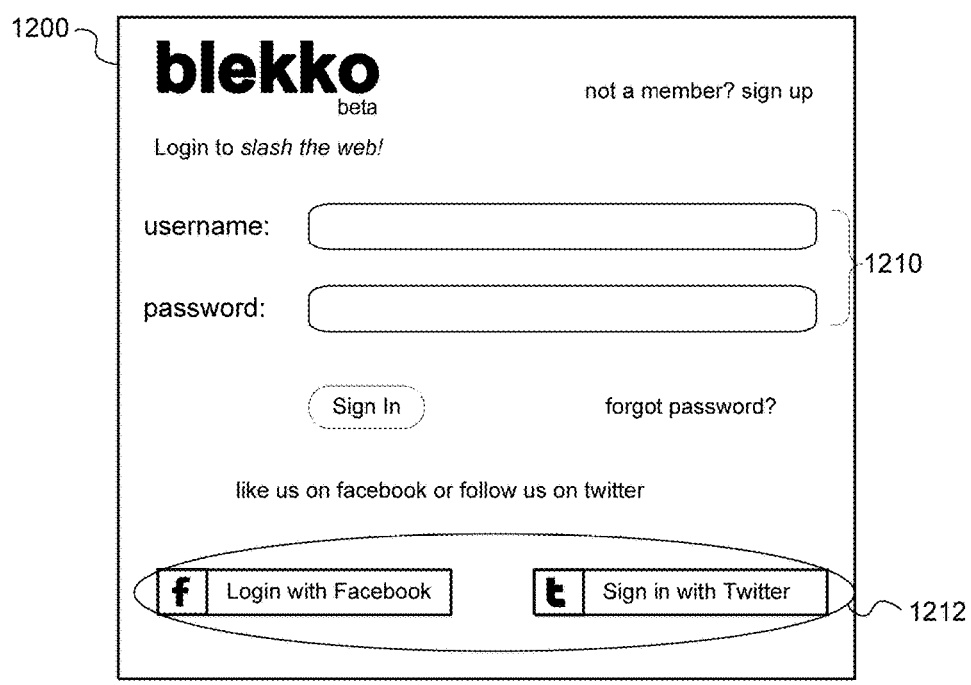
FIG. 12 is a screenshot illustration of a login page to log in to a user's account in the search engine system, according to some embodiments.

FIG. 12 is a screenshot illustration of a login page 1200 to log in to a user's account in the search engine system previously described in one or more embodiments above, such as search engine system 102 of FIG. 1. The login page 1200 includes a field for entering a user name and password 1210 to access several tools, features, and preferences that allow a user to customize the user's experience with the search engine system 102. The search engine system allows for searches conducted using slashtags.

Additionally, the login page 1200 includes one or more links to external third party service providers, e.g., social networking sites 1212, that allows a user to log in to the search engine system via the third party service provider, such as a social network site. For illustration purposes, the login in page 1200 shows buttons/links that allow the user the option to log in to the search engine 102 via Facebook or Twitter. By opting to log in via an external social network site, such as Facebook or Twitter 1212, the user has access to additional features provided by such external sites, that is in addition to search features of their search engine account. The search engine system, such as system 102 of FIG. 1, additionally provides for access to data from the user's social network account to further customize the user's search engine experience. Thus, for example, when a user makes a search request, the search result generated by the system 102 may include a results list that accounts for data or certain preferences of the user's social network.

It will be appreciated that the external social networking sites 1212 may be or may include any third service provider site, and is not limited social networking sites exclusively. The external site 1212 may be any site that provides the search engine system 102 data related to the user or user's preferences that may be useful in customizing or refining search result lists in a search query made by the user.

Figure 13:
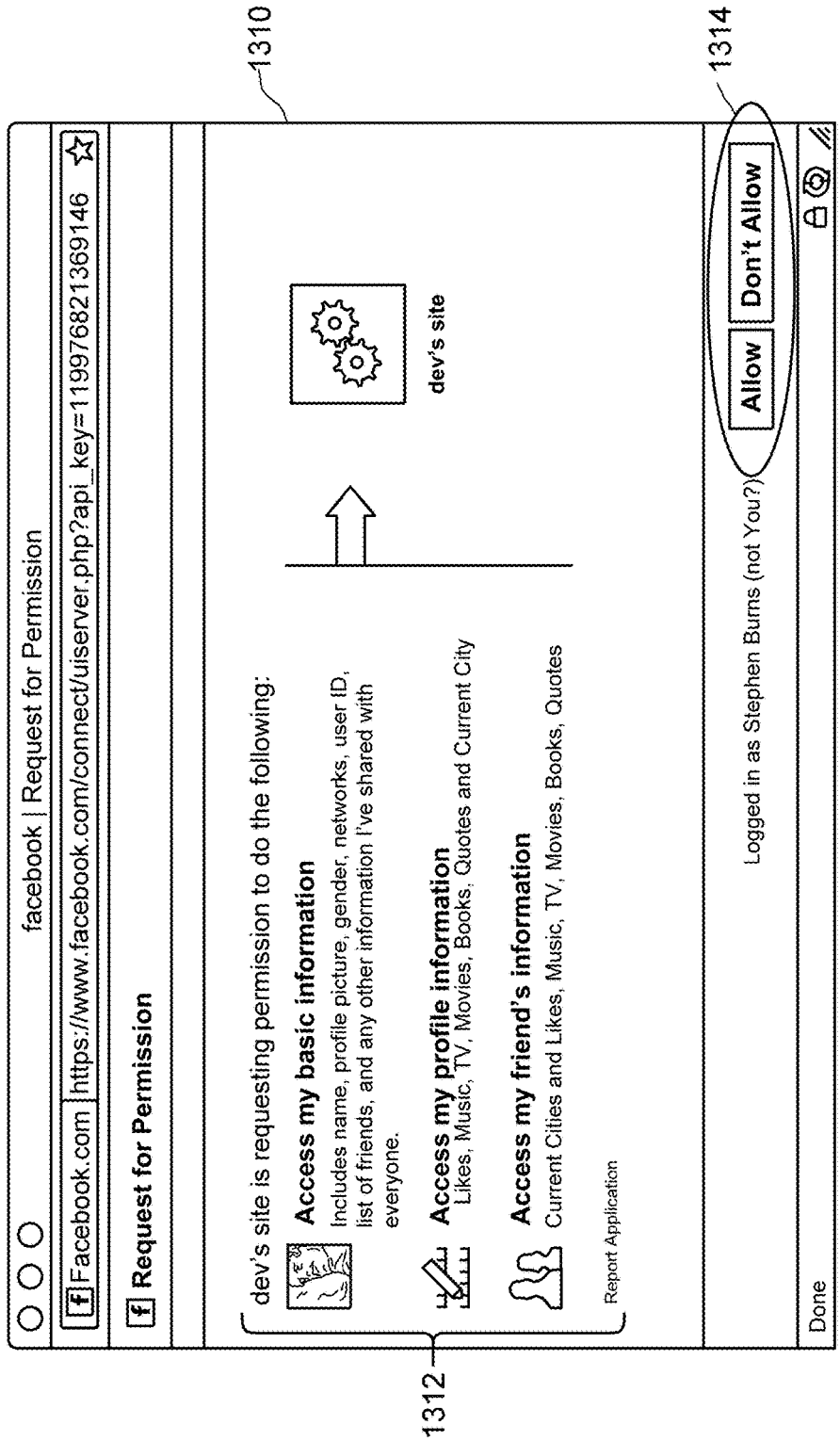
FIG. 13 is a screenshot illustration of a permissions interface for setting up permission preferences to access an external social network site, according to some embodiments.

FIG. 13 is a screenshot illustration of a permission interface 1310 where a user may be required to set up permission preferences as an intermediary step to access an external social network site. For illustration purposes, permission interface 1310 is an example of a Facebook Request for Permission that pops up when the user elects to log in using the Facebook connect link 1212 on the login page 1200 of FIG. 12. In some embodiments, the permission interface 1310 is provided by the external social network site. The permission interface 1310 may provide to the user a list of features 1312 that the user's search engine account will be allowed to access once the login is enabled via the user's social network account. In some embodiments, each item in the list of features 1312 may be links to additional permission interfaces that allow the user to further customize the types of information the search engine will have access to. If the user is satisfied with the list of features 1312 being accessed by the user's search engine 102 account, the user may select the "Allow" button from the access enable buttons 1314 to log in to the search engine via the user's social network account. Alternatively, the user may select the "Don't Allow" button from the access enable buttons 1314 in which case the user is redirected to the user's search engine account without access to the user's social network account. In some embodiments, the user may be redirected to the login page 1200 to reenter login information without the selection of any third party service site or the ability to select another third party service site.

Figure 14:
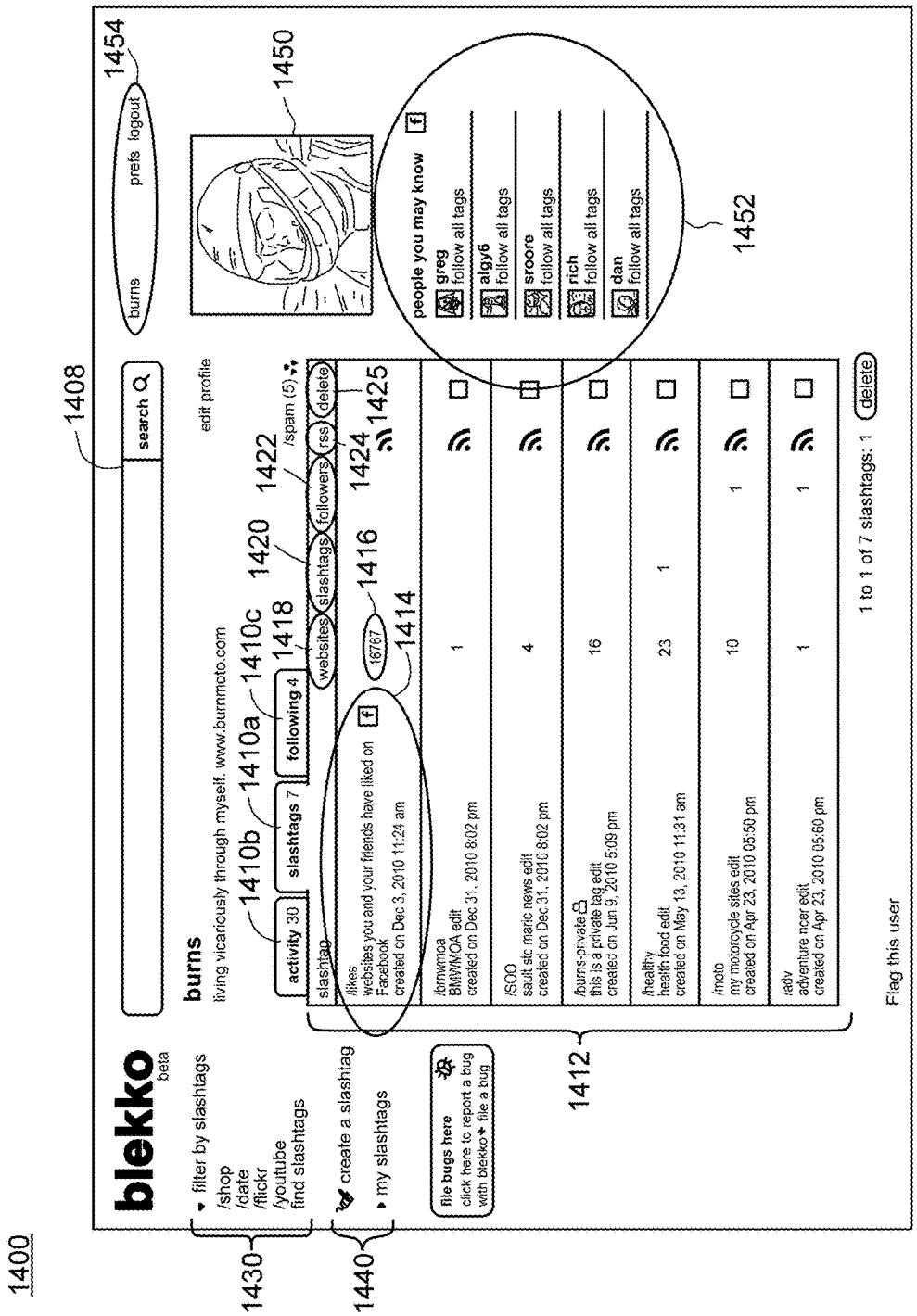
FIG. 14 is a screenshot illustration of a search interface provided to a user once the user has logged in via a social network site, according to some embodiments.

FIG. 14 is a screenshot illustration of a search interface 1400 provided to the user once the user has logged on via a social network site 1212, according to an embodiment. Some of the features in the search interface 1400 are provided by the search engine system 102 and some are provided by the social networking site that the user logged onto to access the search engine. The search interface 1400 includes a search field 1408 for entering search terms. Slashtags tab 1410a, activity tab 1410b, and following tab 1410c are similar to tabs 1040, 1042, and 1044 of FIGS. 10A-10C and includes at least the same features described previously.

The slashtags tab 1410a includes a list of slashtags 1412 that are monitored or maintained by the user or by the system 102. The slashtags list 1412 may be user created slashtags, system generated slashtags, and/or user selected slashtags (generated by the user, the system 102, or other users). Slashtags tab 1410a additionally includes a /likes slashtag listing 1414 that is generated based on data which the search engine 102 has access to via the user's Facebook account (in this case). The /likes slashtag tracks websites which the user and the user's friends have indicated that they "liked" on Facebook. Many websites include a "Like" icon or other social network indicators next to a Facebook logo (see for example 1622 in FIG. 16) that when selected posts an indication on a user's Facebook account (e.g., comments page or "wall") that the user liked the associated website. The "Like" data of the user who has logged into the search engine system 102 via the social network site, and the "Like" data of the user's friends in the user's social network, are accessed by the search engine system 102 to generate the /likes slashtag listing 1414. The user may conduct searches based on "likes" preferences indicated by the user and user's friend in the user's social network account.

Additional attributes of the slashtags in the list 1412 are maintained within the slashtags tab 1410a. The number of websites marked or included for each slashtag in the list 1412 is displayed under a "websites column" 1418. For example, the number of websites that are "liked" by the user and the user's friends extracted from the user's Facebook account is indicated by the value 1416. In this case, the user and user's friends liked 16,767 websites. Thus, when a search query is entered by the user in search field 1408 and the search query includes /likes slashtag, the 16,767 websites will be considered when generating the search result.

Slashtags column 1420, followers column 1422, rss column 1424 and delete column 1425 provide additional information about each slashtag in the list 1412. Slashtags column 1420 indicates whether the data associated with the slashtag is associated with any other slashtag. The slashtags column 1420 shows the number of slashtags that are included in the present slashtag. For example, the slashtag /healthy has one other slashtag included in it. The followers column 1422 indicate whether there are other users tracking and/or maintaining the slashtag. For example, the followers column 1422 indicate that there is at least one other user who is following the development of or modifications to /moto and at least one follower to /adv. The rss column 1424 indicates whether there is an rss feed associated with the slashtag. Clicking the icon in the "rss" column gives an rss feed of a search based on the given slashtag. In some embodiments, the rss feed may be more than one feed, and/or the rss feed may be ordered by date. For example, clicking the rss icon next to /likes initiates the search [/likes /date /rss]. When viewed in a web browser, the rss output causes the browser to prompt the user to add this rss feed to an rss feed reader. The delete column 1425 gives the user the option to deleting a slashtag from the list 1412. The "delete" column 1425 is used for editing the list of slashtags 1412. When the delete box is checked and the user hits the "delete" button at the bottom of the delete column 1425, the present slashtag will be deleted from the list 1412.

Other features of the search interface 1400 include slashtags filter list 1430 and my slashtags 1440, which allows users to add, remove, categorize, maintain, and view slashtags generated by the system 102 or created by the user respectively. Additional details for these features are provided in previous sections.

The search engine 102 may also capture and display a profile picture of the user 1450 from the user's social network account. Other information from the user's social network account may also be displayed, such as a list of "people you may know" 1452, which is generated by Facebook in the user's Facebook account. Thus, various applications and features may be shared when a user logs into the search engine via a social network or another third party service provider, or alternatively, if the user accesses a third party service provider via the search engine system 102. Finally, the user has the option of selecting preferences or logging out of the search engine account by selecting options 1454.

Figure 15:
FIG. 15 is a screenshot illustration of a list of Uniform Resource Locators associated with the /likes slashtag, according to some embodiments.

FIG. 15 is a screenshot illustration of a list of Uniform Resource Locators ("URLs", e.g., websites) 1516 associated with the /likes slashtag for a user account. In the example of FIG. 15, a search query includes the /likes slashtag as indicated by the slashtag search query 1510 in search query field 1408, which generates the websites associated with the /likes slashtag for user Burns in the search result list 1516. In other words, when such a query is made, a search result is generated for the websites that user Burns and user's friends have liked on Facebook, as indicated by "burns/likes" 1514. In this sample screenshot, the search result yielded 18,237 URLs associated with the /likes slashtag for user Burns. Additional attributes or action items 1517 may be viewed for each of the websites such as site, rank, seo, and the option to delete the site. Other features may be included on the search result page, as previously described, such as the profile picture of the user 1550 from the user's Facebook account.

Figure 16:
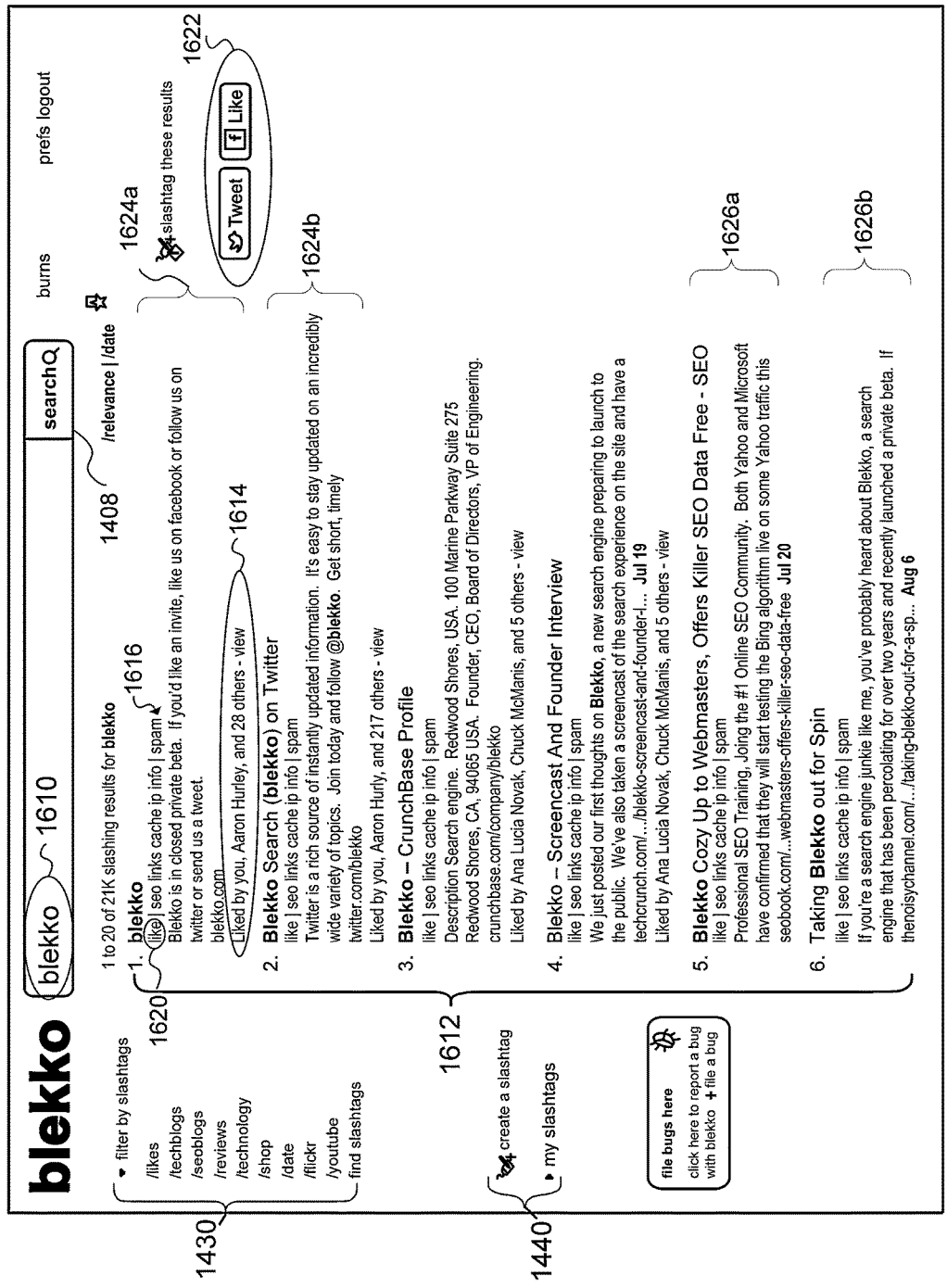
FIG. 16 is a screenshot illustration of a search query conducted while logged in to a search engine via a social network site, according to some embodiments.
Figure 17:
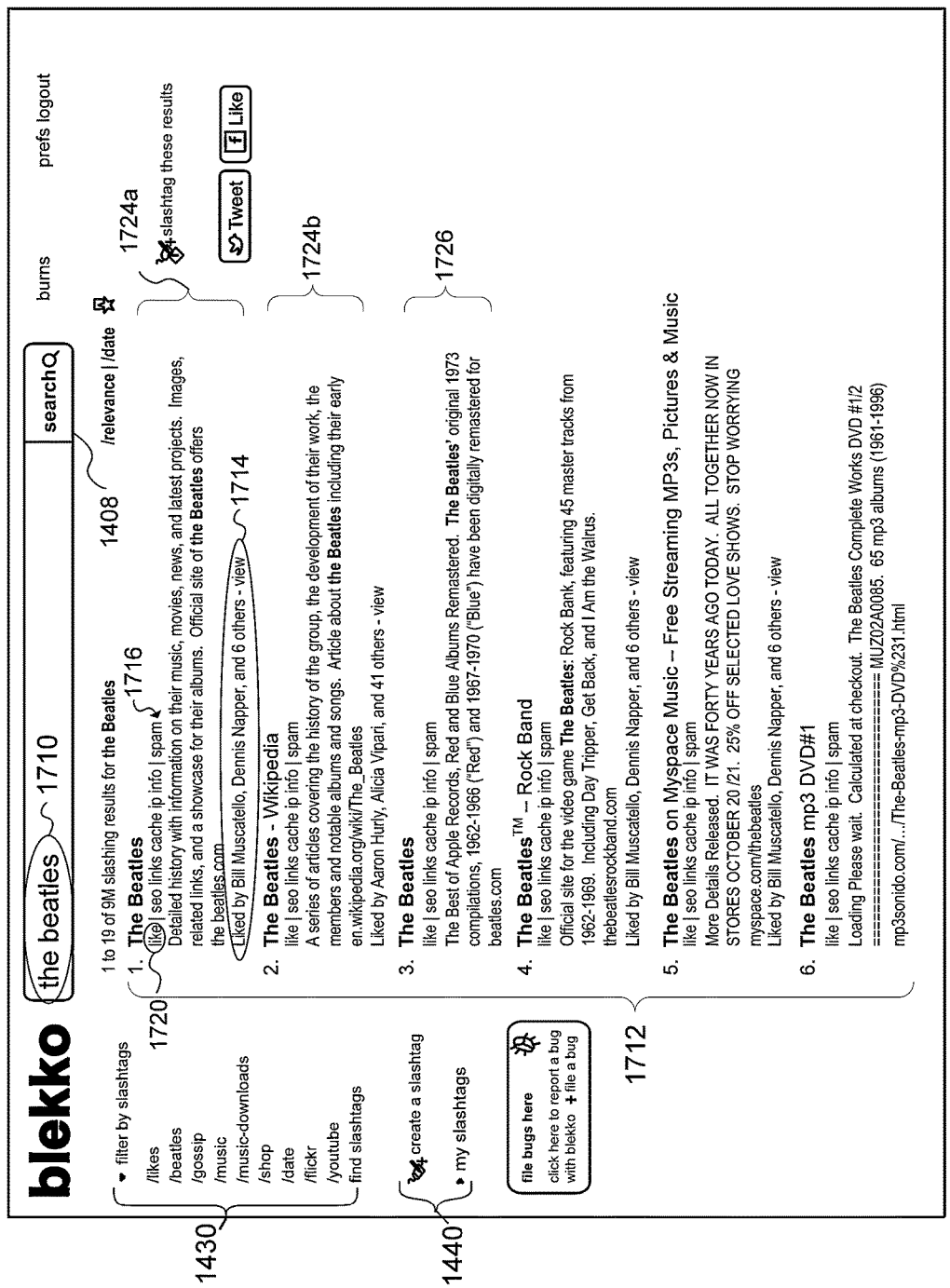
FIG. 17 is screenshot illustration of another search result generated while logged in to a search engine system via a social network site, according to some embodiments.
Figure 18:
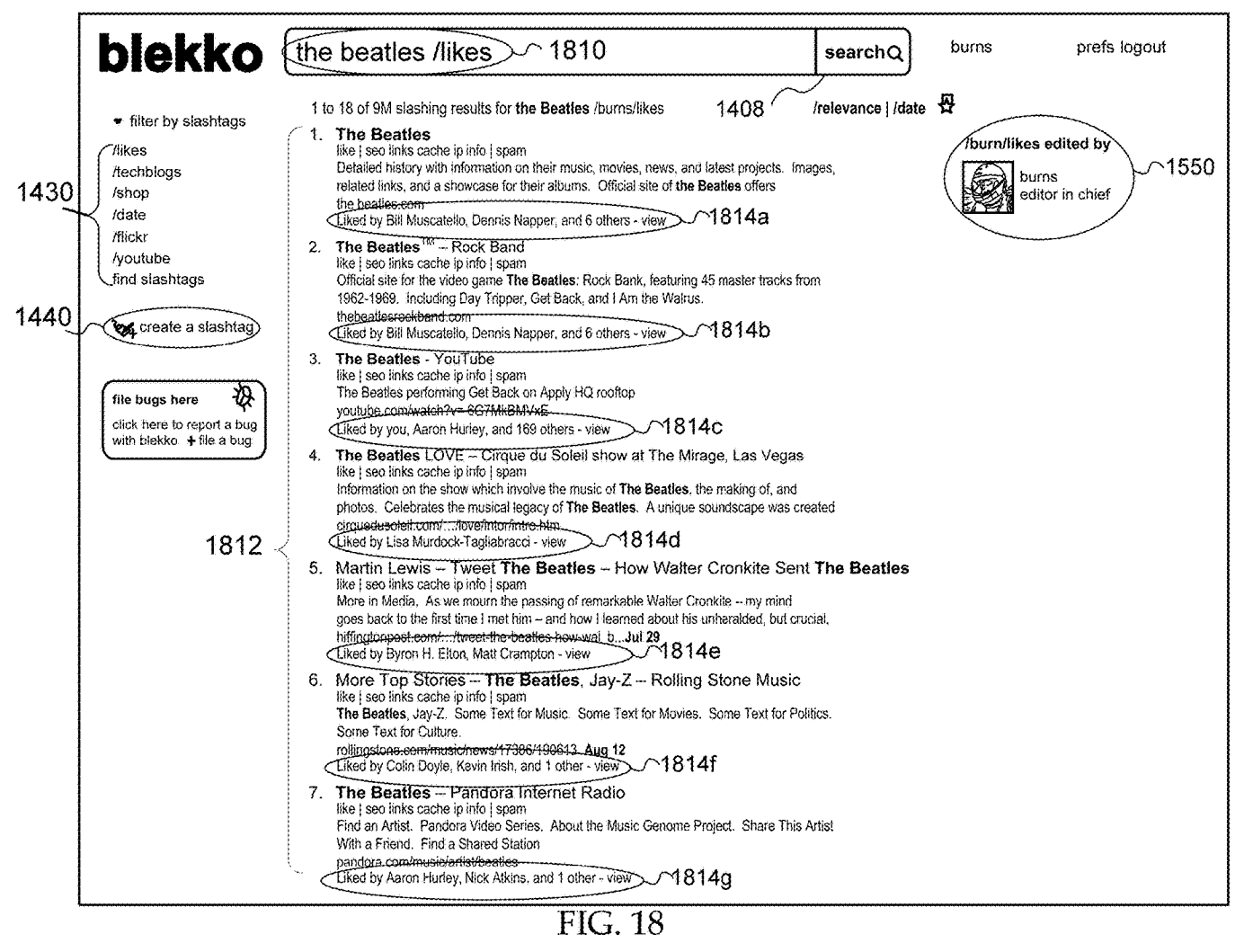

FIGS. 16-18 are screenshot examples of various search queries that layers information from the user's social network account or other third party services into the search result when the user logs in to the search engine via these other third party services. In the first example, FIG. 16, entering a search query term [blekko] 1610 into the search query field 1408 generates a search result 1612 of various Blekko related websites.

Since the user has logged on via the user's Facebook account, an additional site tag "like" 1620 is displayed in a string of site tags 1616 for each search result. The "like" tag 1620 is one example of a social network indicator. In this case the "like" tag 1620 when selected indicates the user has a preference for or "likes" this link or result item. If "like" information is available from the user's Facebook account, a "Liked by" line 1614 is also provided for each search result item. The "Liked by" line 1614 lists one or more users who indicated they liked the associated website. The total number of people who indicated they liked the website may also be indicated. For example, "Liked by you, Aaron Hurley, and 28 others" displayed in a search result item 1624a indicates that the user and user's friend "Aaron Hurley" both liked the website "blekko.com." Additionally, 28 other friends of the user also liked the website "blekko.com." In another search result 1624b, there are 217 other friends of the user who liked the second website in the search result list 1612.

In some embodiments, the determination of which names to display in the "Like by" line 1614 is generated based on relevance and ranking calculations, such as relevance determinations described in other sections. In some embodiments, selecting a name from the "Like by" line 1614 redirects the user to selected friend's Facebook profile. The redirection may include providing the friend's Facebook profile in a new browser or user interface, or providing a new tab in the same browser or user interface.

Some of the search result items in the list 1612 do not provide a "Liked by" line because, for example, the user may not have liked the site, may not have come across the site, or none of the user's friends may have indicated whether they liked the particular site. Search result items 1626a, 1626b are examples of two websites in which "Liked by" information was not available, and therefore not displayed.

Additionally, the user may indicate the user liked the [blekko] search result and may decide to share the search result with others by selecting one of the share icons 1622, which gives the user the option to post the search result as a "Like" website in the user's Facebook profile or to "tweet" the search result in Twitter.

In some embodiments, the user may optionally make a preference to adjust or modify the results list 1612 based on data associated with the /likes slashtag. For example, the user may optionally request the search result to be generated and ranked based on the number of likes each website has. Thus, a greater importance may be placed on the "likes" count from the Facebook data, and may affect the ranking of the search result list. For example, the search ranking of the search result may be configured to place the sites with more "likes" to be displayed closer to the top of the list and the sites with less or no "likes" to be placed lower in the list. In some embodiments, the user may request this change of the ordering of the search result(s) by clicking on a "Likes" sort icon (not shown).

FIG. 17 is another example of another search result, this time based on a search query [the beatles] 1710. Search result list 1712 is shown for the search query [the beatles] 1710 as another illustration, and to compare to the next screenshot in FIG. 18. Similar to the search result list 1612 of FIG. 16, each website associated with "the Beatles" in the search result list includes the "like" site tag 1720 in a site tag line 1716, and a "Liked by" line 1714 if available. For example, there is "like" information associated with the websites in result items 1724a and 1724b from the user and the user's friends. However, there does not appear to be any "like" information for display for the website in search result item 1726.

FIG. 18 is an example of how the search result of FIG. 17 may be modified when a /likes slashtag is included in the search query to [the beatles/likes] 1810. By including a /likes slashtag, a search result list 1812 is generated differently from the search result list 1710 in that only Beatles websites that the user or user's friend has indicated that they liked are considered when generating the search result. Thus, every result item in the list 1812 includes a "Liked by" line 1814a-g. Each "Liked by" line displays one or more people from the user's Facebook account who liked the associated website and the total number of people who liked the website. As previously described, the display of the "Liked by" line 1814 may be determined based on some ranking or ordering rubrics from user preferences or by the search engine system 102.

Figure 19:
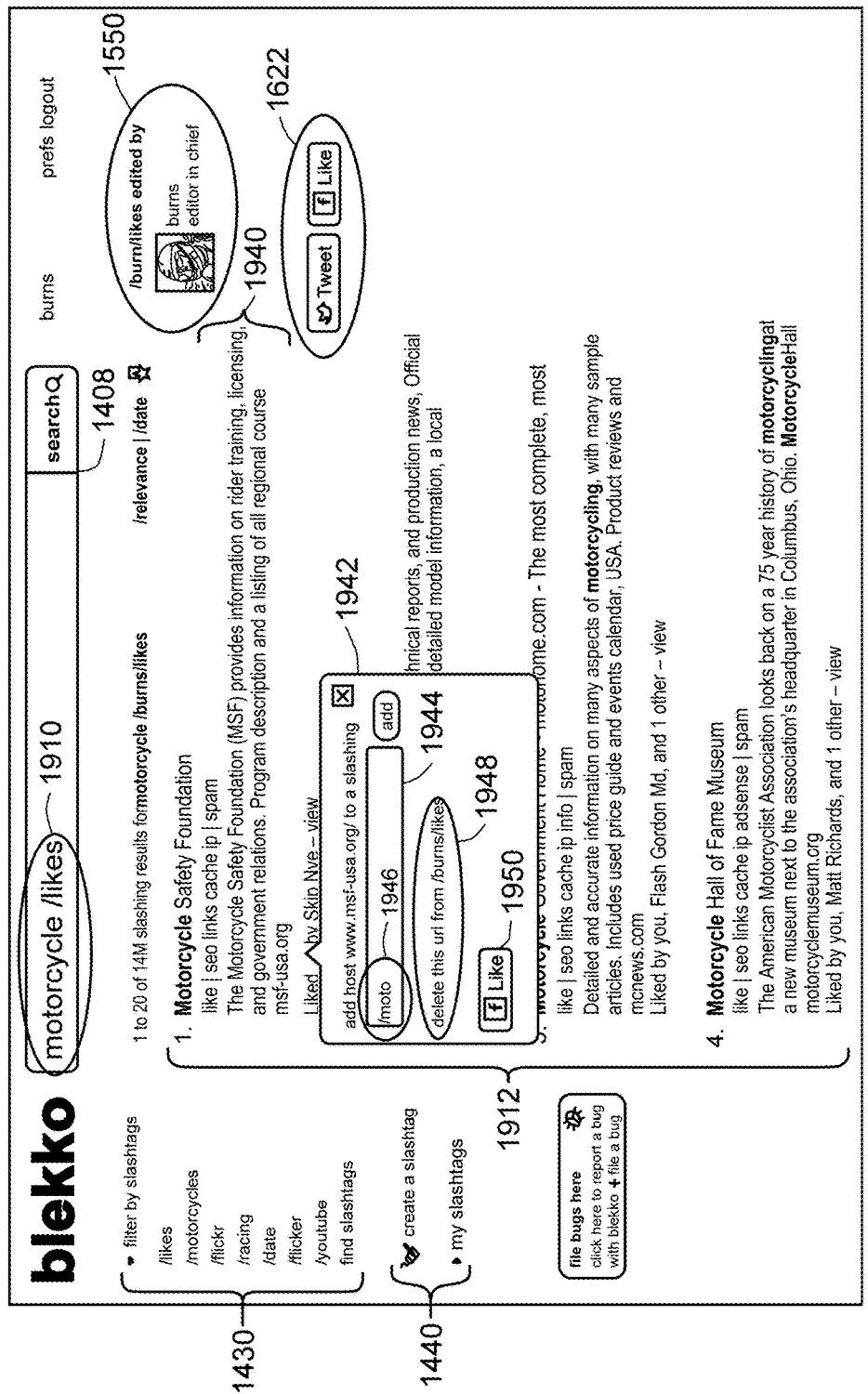
FIG. 19 is a screenshot example of another feature of the search interface, according to some embodiments.

FIG. 19 is a screenshot example of another feature of the search interface according to other embodiments. In some embodiments, selecting the "like" site tag link opens a pop-up window 1942 that allows a user to add the associated website to one or more slashtags of the user. In this example, upon entering a search query [motorcycle/likes] 1910, a user may add any of the websites in search result list 1912 to any slashtag the user desires, such as to any one of the slash tags in the lists 1430, 1440. In the screenshot example, the user is adding the first result item "msf-usa.org" 1940 to slashtag /moto 1946. Additional features in the window 1942 may allow the user to delete websites from slashtags, e.g., the users /likes list 1948. The user may also mark the website as one of the sites the user likes and posts the preference to the user's Facebook account via Facebook's "Like" button 1950.

Figure 20:
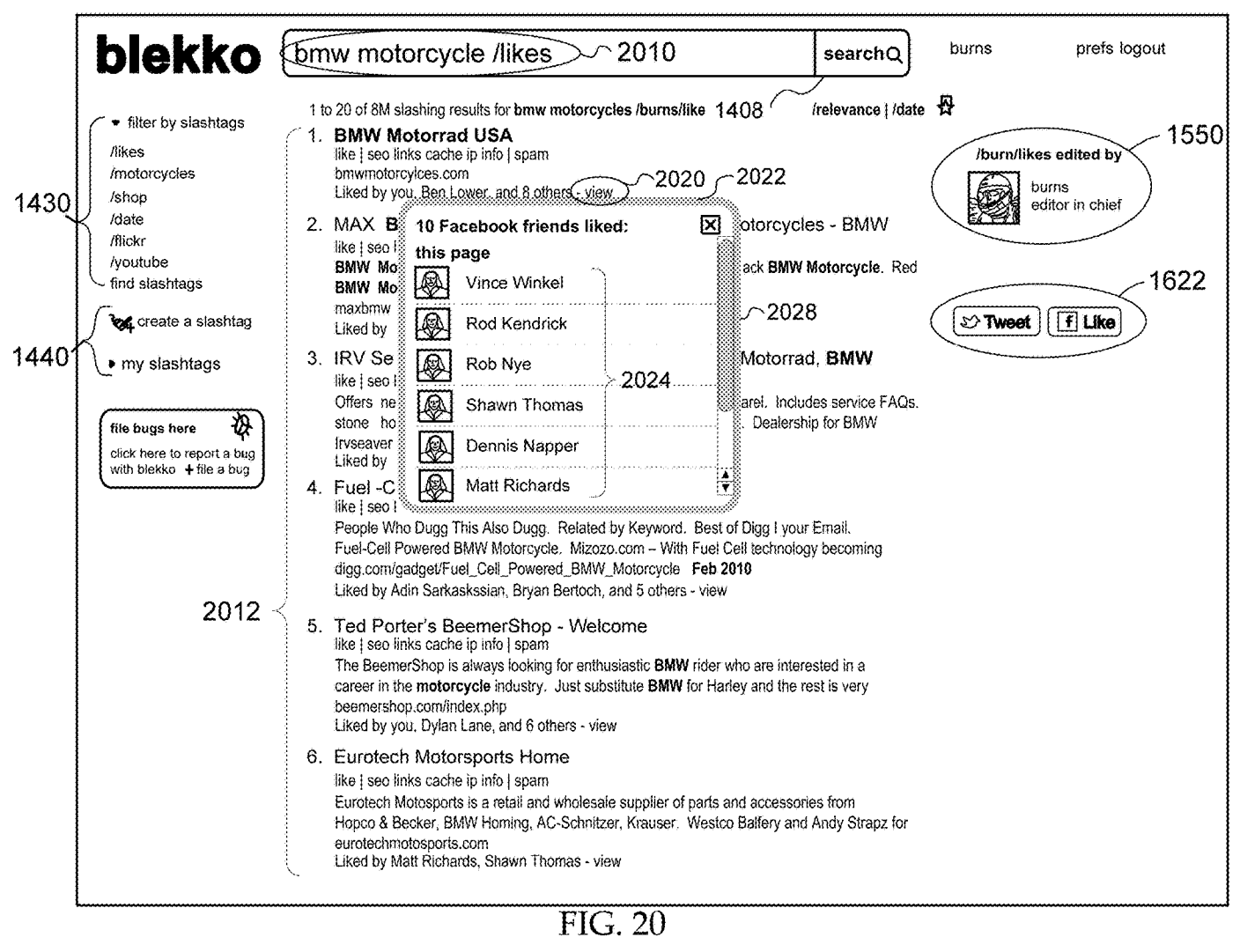

FIG. 20 is a screenshot example of another feature of the search interface according to some embodiments. As another illustration, another search result list 2012 is shown, generated from a search query [bmw motorcycle/likes] 2010 that utilizes the /likes slashtag. Only websites that the user or user's friend indicated that they liked are considered for the search result. For the "Liked by" line in each result item, an additional feature "-view" 2020 is provided. The "-view" feature 2020 when selected by the user opens a pop-up window 2022 that lists all the friends who liked the associated website in the search result list 2012. For example, the "Facebook Friends liked:" window 2022 corresponds to the ten friends who liked the website "bmwmortocycles.com" in the first result list item. That is, the user Ben Lower plus 8 others liked this website. Ben Lower is shown in the "Liked by" line of the first result item. Upon selecting the "-view" link 2020, additional friends who liked the website is listed. All the friends may be viewed by scrolling up and down the interface using scroll bar 2028. In some embodiments, selecting a user from the list 2024 redirects the interface to that friend's profile page in Facebook.

Other useful slashtag tools may be used to enhance the search query and allow for more relevant and/or customized search results to be generated.

Boosting a slashtag gives the slashtags a boosted ranking capability so that certain search results appear higher in the generated results list. Search Engine Result Pages (SERPs) are normally presented in an order, determined, for example, by the rank of the URL (for /relevance sorting) or by the chrondate of the URL (for /date sorting). With a boosted slashtag and /relevance sorting, SERPs that are present in the slashtag are given a boosted rank, so that they appear higher in the results than they would in a slashtag-less search. Content may be given a boosted ranking based on one or more boosting algorithms or one or more criteria that may make the content relevant after boosting when it may be, for example, otherwise overlooked in a non-boosted slashtag search. Boosting generates SERPs that may be from broader mixed topics, selected based on boosted criteria. For example, boosted criteria may be based on a collection of opinions or reviews within a community or top ranked sites from lists at other sites and on a particular industry, field, topic, popular culture, and so on. Boosting criteria may be based on popularity, frequently hit, frequently asked, trends, and so on. It includes any reason for increasing the relevance or weight of a SERP or set of SERPs to associate with the boosted slashtag that may not be apparently relevant on its face or in a normal search. For example, the normal slashtag usage [/foo] is to show only webpages in the slashtag. Any slashtag can be either used normally or as a boost [+/foo]. In boosted mode, the results will contain a mix of websites in the slashtag /foo and websites not in the slashtag /foo; the order of the results is affected by the boost.

Boosting is useful when search queries include ambiguous terms or terms that may have multiple definitions or associations. Boosting is also useful when common terms have a proper name association or a socio/cultural meaning. For example, "oatmeal" may be associated with recipes and food sites, or it may be the name associated with a popular comic strip. Determining the boosted rank of webpages associated with a boosted slashtag can be done a number of different ways.

The end result after boosting slashtags in a search query may generate an intermixing of boosted and non-boosted results. However, the user may request a result list that displays only the boosted results.

The syntax of boosted slashtags is now described by way of an illustration. A /foo slashtag restricts results to only URLs matching the /foo slashtag. A boosted slashtag may be referred to by the syntax +/foo. This slashtag can be used either in the normal form /foo or the boosted form +/foo.

In some embodiments, the user decides when to use a slashtag normally or as a boosted slashtag when a search query is specified. In other embodiments, the boosted slashtag may be automated, by the search engine 102 or based on user preferences, in any number of ways previously described above for assigning or identifying slashtags. For example, a boosted slashtag may be automatically enabled as a user types in "oatmeal"+"comic strip."

Figure 21:
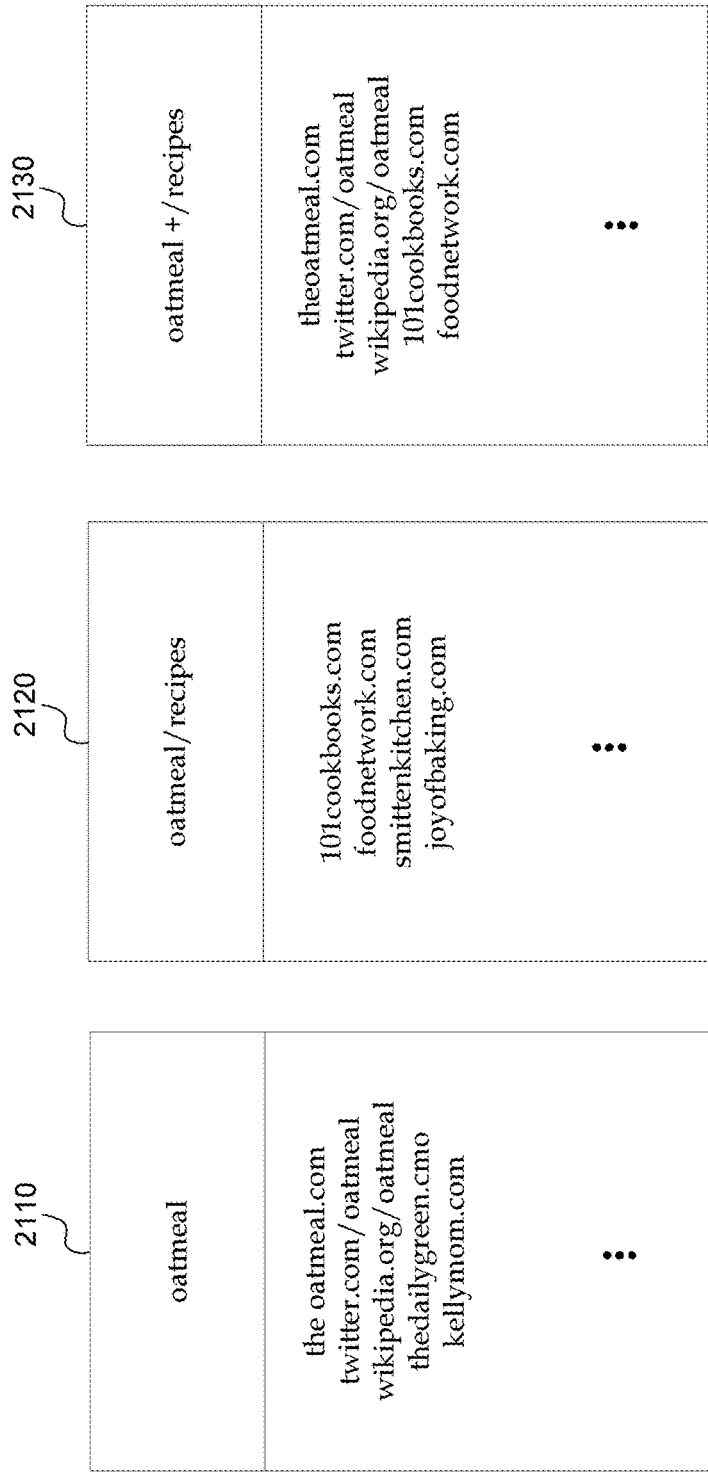
FIG. 21 illustrates screenshot representations to show how search results are generated using boosted slashtags, according to some embodiments.

FIG. 21 includes screenshot representations to show how search results are generated using boosted slashtags, according to some embodiments. For purposes of illustration, different types of search queries are shown for the subject "oatmeal." In a first search query result 2110, a common search (e.g., without the use of slashtags or boosting) of the term "oatmeal" generates a list of websites that related to the topic "oatmeal" but in a generic or broad manner. To illustrate the broad range of ways in which the term can be used, the query result 2110 includes a website for a comic series named "The Oatmeal", commentary about oatmeal on twitter, general description or definition of oatmeal on Wikipedia, the health benefits of using oatmeal on The Daily Green website, and so on.

In a second search result 2120 of a query of the term "oatmeal" with a slashtag /recipe, a narrower search result is generated. The search result list contains food-related websites that may contain recipe information for "oatmeal".

In a third search result 2130, the query is for the term "oatmeal" plus a boosted slashtag +/recipes. A boosted query of "oatmeal" and /recipe generates top ranked websites relevant to the term "oatmeal", which includes those that are relevant to "recipes" and other top ranked sites that may not be related to "recipes", but are so relevant to "oatmeal" that the user may be interest in them.

In one boosting method, as an illustration, SERPs may be given a boost depending on expert or popular opinions that affect which content is associated with a boosted slashtag category. SERPs that fall within this category may be included in a search result of a boosted slashtag. The content associated with the boosted slashtag may be edited and managed by one or more experts or a community of experts who determine which pages are most relevant to a slashtag category or a subset of slashtags. Experts may be editors, associate editors, or experts in the field from either private or public sectors. Experts may even be broadly defined to include trend-setters or followers, or any user who is actively engaged with the content at issue (e.g., editors), on the Internet or otherwise.

These experts may make such determinations using manual or automatic processes to create, update, and manage content associated with slashtags. In another example, expert content may be extracted from expert websites and other locations on the Internet that maintain information associated with the slashtag(s). In other words, content from a website that reliably generates information related to a slashtag topic may be derived or included based on boosted rankings. For example, external websites, e.g., newspaper and magazine sites, may contain useful ranking data, and if such websites are commonly relied upon or well-known in the field, the content from those sites may be regarded as expert sites and part of the expert community. In other examples, these reliable sources may be identified based on criteria such as most popular, frequently visited, reputable high-quality content, brand-name, and so on. Information from these content resources may be accessed using automatic, manual, algorithmic, or combined methods.

The "community" may be a social network community or some other third party community in which people in the community can share comments and ideas and respond to the shared content. Thus, expert determinations may be based on preferences and comments from people in a user's social network or a larger defined network. The data shared by the community or a subset of the community may be used to rank and determine the boosting.

When a search query includes a boosted slashtag, the top ranked results selected by the expert(s) are presented. In some embodiments, the boost to the rank is given by a "boosting formula", which may involve any number of means to accentuate the relevance of one or more search result items or lists of search results. For example the boost formula may be algorithmic. Algorithmic examples include adding a constant to the rank, multiplying it by a factor, or utilizing a more complicated formula to one or more sections of the ranking calculations. In some embodiments, a combination of manual input and algorithmic methods may be implemented to determine the boost ranking Boosted slashtags can also be used in combination with other features. For example, a user's /all slashtag (i.e. /greg/all) is the union of all of a user's slasthags, and a user's /allall slashtag (e.g. /greg/allall) is the union of every slashtag that a user can edit, or that a user is following. For example, user Greg may have been granted permission to edit /blekko/early-music and /mike/vegan, and follow /sam/ethiopia. Adding +/greg/all or +/greg/allall to every search that Greg does will tend to boost all results that Greg is interested in, without Greg having to specify a specific slashtag. In some embodiments, +/greg/all or +/greg/allall is added to every query done by user Greg, if a preferences checkbox is checked.

Boosted slashtags also combine nicely with another slashtag /history. The /history slashtag contains the previous URLs clicked on by a user (e.g. /greg/history), either only URLs clicked on in blekko SERPs, or, in another embodiment, all URLs clicked on by Greg in any browser, perhaps collected by a browser extension or toolbar. If Greg wishes to re-find a website from last week, and he remembers a few words that appeared on that website (e.g. 'viola da gamba'), a search of [viola da gamba /history] should bring up the correct website.

The boosted slashtag +/history will boost all websites viewed by the user in the past. A user might choose to include +/history in many searches, and like the previously mentioned feature of adding +/allall to every search, a checkbox in the user preferences can instruct a search engine to add +/history to all searches.

The /likes slashtag can similarly be boosted (+/likes) to increase the weight of relevancy to any results which are in /likes. And +/likes can be automatically added to every query if a preferences checkbox is checked.

The /history slashtag can be extended to include the user's browsing history and the browsing history of all of the user's friends. This union slashtag might be named /allhistory.

It will be appreciated that the /history slashtag deserves special treatment from a privacy point of view. In some cases, many users may feel embarrassed if their entire web browsing history was exposed to public view for privacy reasons, for example, a theft of data or the subpoena of an ex-spouse. To protect the contents of the /history slashtag while stored on servers of the search engine 102 of FIG. 1, the contents of the tag can be encrypted using a key provided by the user, and only decrypted each time that the /history slashtag is used. Or, the contents of /history can be decrypted each time a user logs in to the search engine system 102, and the unencrypted contents discarded after the user has been idle for a predetermined amount of time, say 15 minutes. With either of these schemes, the unencrypted data will rarely be present on search engine 102 servers.

Figure 22:
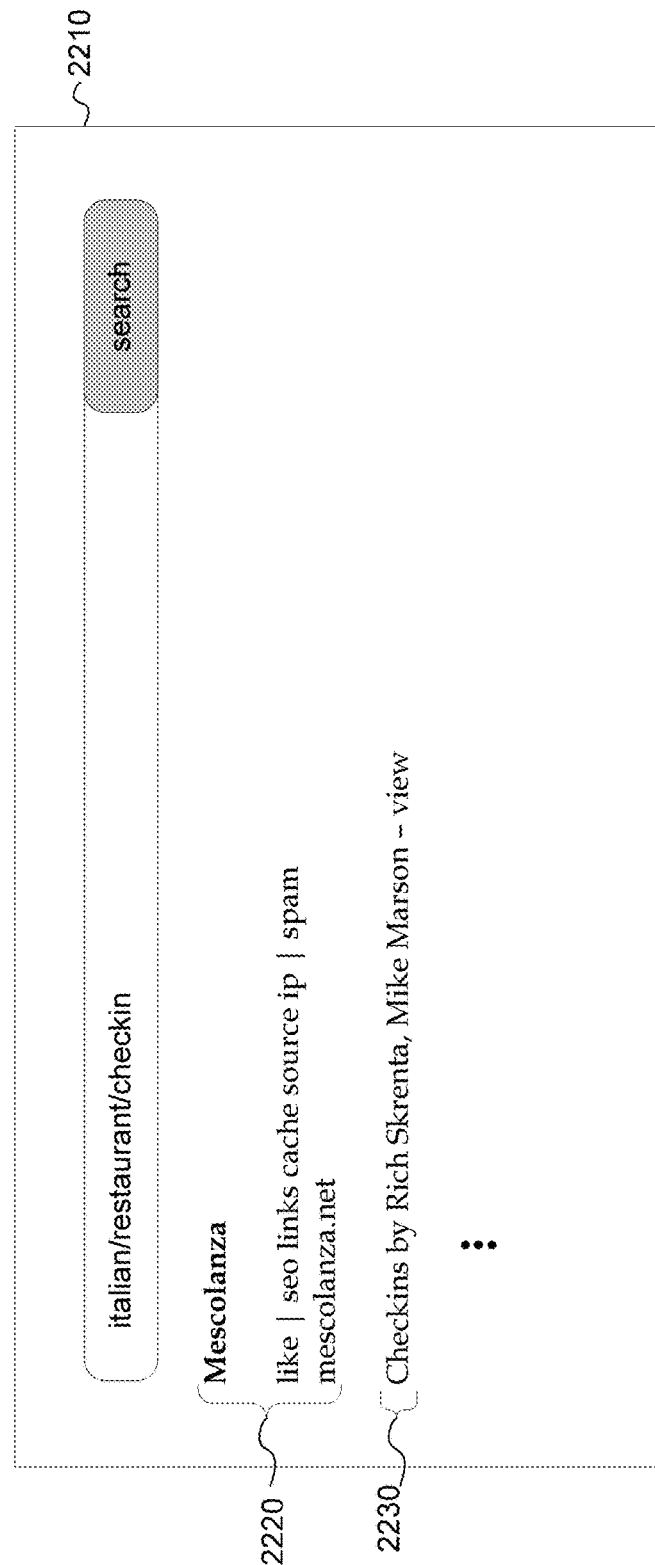
FIG. 22 is a block diagram illustrating a search result generated using a /checkin slashtag, according to some embodiments.

FIG. 22 is a block diagram illustrating a search result 2210 generated using a search operator associated with content from one or more social network sites, such as a /checkin slashtag, according to some embodiments. These search operators enable the search engine 102 to consider content collected on social network sites, such as polling data, as a relevance criteria when generating search results. These search operators may be associated with a category of content from the one or more social network sites. For example, the /checkin slashtag is a special slashtag tool created for user checkin data at external websites, such as foursquare.com, Facebook.com or other social network sites. When friends check in with, for example a business or venue, they may indicate that they have been to that particular business or venue. Some sites allow friends to rate the business or venue. Checkin data may be used to further refine or specify a relevance criteria, using algorithms or software modules, for conducting a search query. This feature allows a user to further customize or personalize a search query. Referring back to user example Greg, if Greg is interested in searching for a local restaurant, Greg may prefer to visit restaurants which were either liked by Greg's friends on the Facebook network, or ones that Greg's friend checked into on foursquare.com or Facebook. In the example of FIG. 22, Greg enters a search for "Italian restaurants", but he is only interested in restaurants his friends have checked into. A search result item 2220, Mescolanza, appears at the top of the search result.

The list of friends who have checked in a particular locale can be displayed beneath every result, such as result 2220, similar to how likes are displayed as described previously. When the /checkin slashtag is used, each search result item 2220 additionally displays which of user's friends checked in on line 2230. For example, Greg's friends Rich and Mike have both checked into Mescolanza. Greg may view all the friends who have checked into Mescolanza 2220 using the view link on line 2230.

The /checkin slashtag can also be boosted, +/checkin. Finally, the number of checkins or the number of (checkins+ likes) can be used to re-sort the results into a different order. For example, Mescolanza 2220 may appear on top of the result list based on any one of the ranking determinations previously described. The ranking determination that placed Mescolanza 2220 on the top may, alternatively, be based on or may additionally factor in whether one or more of Greg's friends liked Mescolanza 2220 and/or consider a score or rating that Greg's friends previously assigned to the result at the external websites, such as foursquare.com or Facebook. In some embodiments, a combination of "likes" and "checkin" criteria may be considered to generate search result ranks or to re-sort the search result.

Checkin data from non-friends is also useful in the aggregate, to help determine what locations are popular, or open at all. However, aggregate checkin data is much more subject to spamming than the checkins of friends. Thus, the aggregate data needs to be carefully examined by anti-spam algorithms.

Checkin data, can sometimes be difficult to correlate to the actual websites of restaurants, bars, and stores. Checkin websites often create their own webpages for every known business, and only a fraction of these webpages have a pointer to the so-called "primary webpage" directly maintained by the business. In some embodiments, the primary webpage is determined or the checkin websites may be stripped to identify the primary webpage, and search results may be generated to provide the primary webpage. For example, the URLs of the checkin websites, e.g., foursquare.com or Facebook, may be used to extrapolate the primary webpage, which then can be used in the search result. The search result list may include only the primary webpages, or a mix of both primary and non-primary websites associated with the search query.

It will be appreciated that the checkin data is not limited to restaurants, and may apply to any subject or category. For example, checkin data may apply to movies, entertainment venues, vacation spots, hotels, other businesses, and so on. It will also be appreciated that similar techniques can be applied to include data from other service websites or social websites where user preferences, comments, reviews, and so on may be utilized in generating search results, e.g., /likes preferences of friends on Facebook or reviews on Yelp.

Two or more slashtags may be grouped to conduct a particularized type of search. For example, two special groups of slashtags are used to answer queries such as [pizza san francisco]. The first is /local, which contains all businesses within a certain locale, and the second is /eat, which contains businesses serving food. Both /local and /eat are divided up into sub-tags such as /local/94085 (all businesses in a zip code) and /eat/san-francisco-ca (all businesses serving food in the city of San Francisco, Calif.) In another embodiment, /local/redwood-city-ca might be defined to be the union of a set of zipcode slashtags such as /local/94085.

Social network data, such as likes and checkins, may be used in combination to change or refine the relevance criteria of search queries using slashtags or a combination of slashtags. For example, in the results for [pizza /eat/san-francisco-ca], it is useful to show both likes and checkins from friends. Also, a user may choose to boost the results for likes or checkins (e.g. [pizza +/likes +/checkins /eat/san-francisco-ca]), or such boosting might be the default, or controlled by a checkbox in the user preferences.

Autofiring is another search feature that predicts one or more slashtags to transform a received search query into a slashtag query. The user is thus able to use common search terms without knowledge of an existing slashtag, and expect that an appropriate slashtag query will be assigned to the query. For example, /local and /eat slashtags are both good targets for slashtag auto-firing. A search [pizza san francisco] can be transformed by an algorithm that identifies 'san francisco' as the name of a city, and that pizza is the name of a type of food. Thus, autofiring transforms the query to [pizza /eat/san-francisco-ca]. Autofiring may be used to transform any query to a relevant slashtag format.

Figure 23:
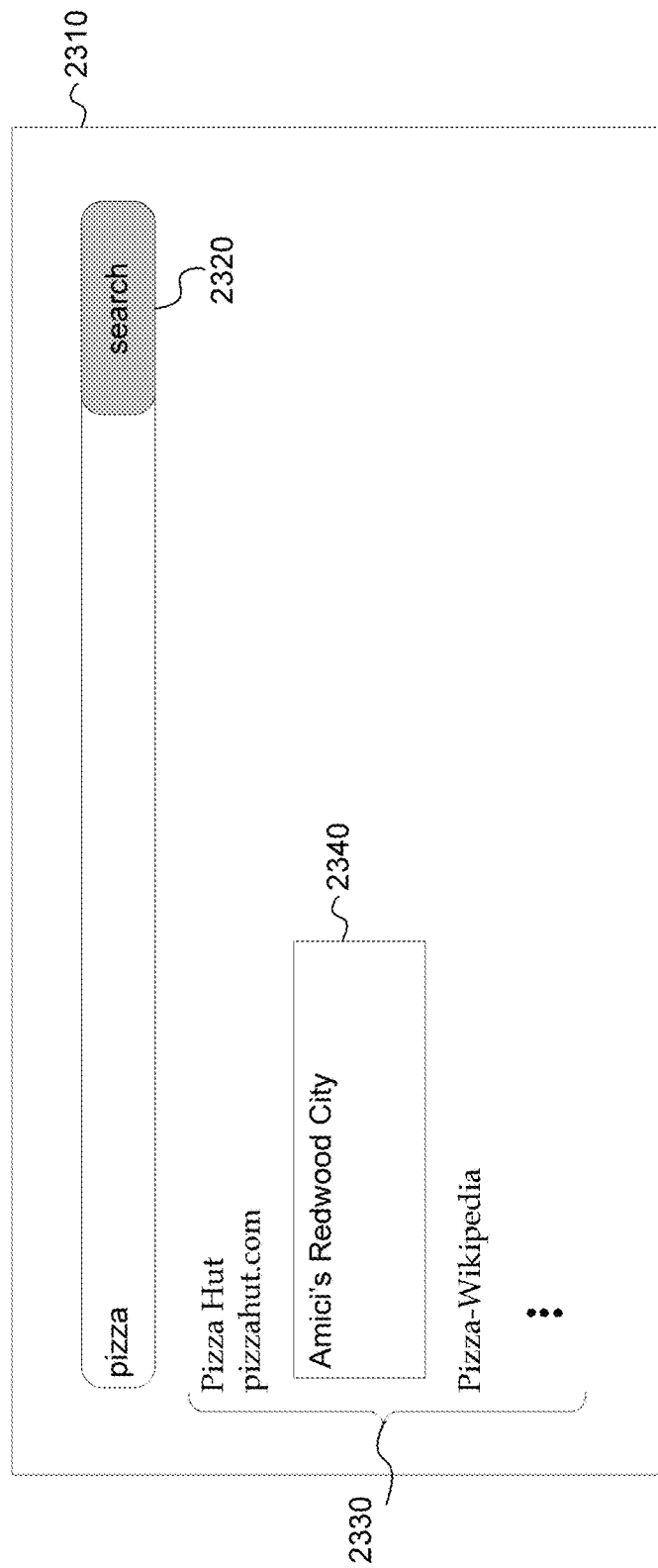
FIG. 23 is a block diagram illustrating a search result generated using a location-based slashtag, according to some embodiments.

FIG. 23 is a block diagram illustrating an example of a search result generated using a location-based slashtag and shown on a display 2310, according to some embodiments. Results from /local or /eat are useful even when a search does not specify a geographic area. The location of a user, for example, may be known (from geo-location of the search IP address or a user's preferences), and for normal searches a one-box field 2340 with a few results for the local area may be displayed in a search result 2330, if the words in a search query 2320 justifies such an answer. Determining whether the search query warrants a specialized box of results 2340 may be determined using the autofiring feature. For example, the query [pizza] in search query box 2320 from a user whose location includes zip code 94085 might feature a one-box 2340 showing a couple of results for the search [pizza /eat/94085], in addition to the normal results for [pizza]. The search [pizza] is thus transformed to [pizza /eat/94085] by autofiring.

Autofirng may also utilizing boosted slashtag features. If autofiring determines multiple slashtags are relevant to a query, in addition to picking only one slashtag, a result with multiple boosted slashtags may be shown. For example the query [lung cancer] scores highly for the slasthags /health and /cancer. The better of the two may be selected by autofiring, but if the scores are close, a result of [lung cancer +/health +/cancer] would be best.

Figure 24:
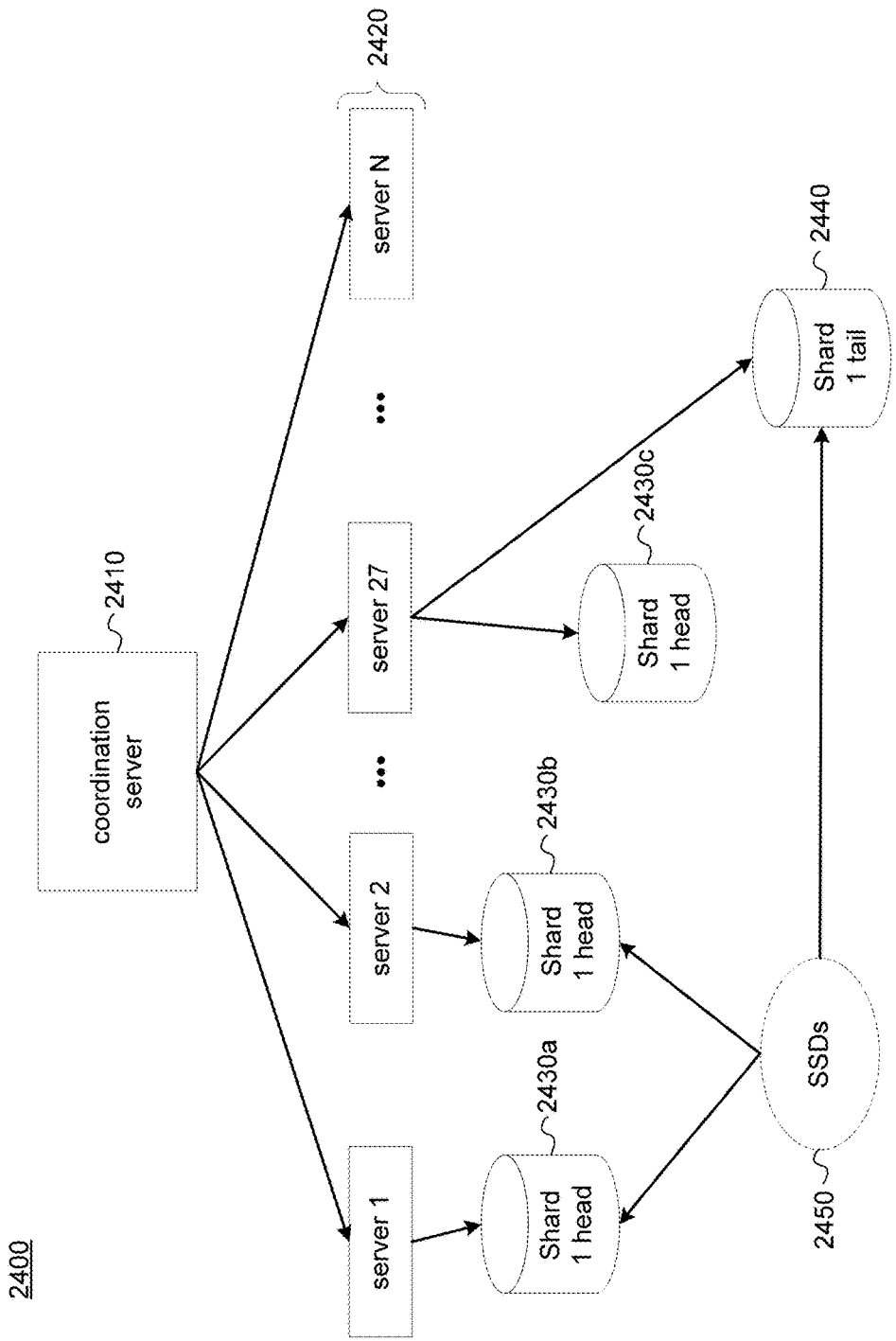
FIG. 24 is a block diagram illustrating a query coordination system, according to some embodiments.

FIG. 24 is a block diagram illustrating a query coordination system 2400, according to some embodiments. Referring again to the search engine system 102 of FIG. 1, a search index is stored on disk on servers at cluster 116, such as servers 2420 of FIG. 24, with every bucket of data replicated three times 2430a-2430c (R3). In some embodiments, the servers 2420 are local servers. Coordination server 2410 may be one or more of the servers in cluster 116, or may be a server external to the cluster 116 but designated the coordination server 2410. Coordination server 2410 interfaces with servers 2420 to retrieve query data from indices stored at 2430 and/or at 2450 managed by servers 2420.

It may be desirable to store this data on solid state disks (SSDs) 2450, but for the purposes of a search engine the data is typically large and SSDs 2450 are more expensive than disks. In some embodiments, a portion of the index may be stored as R3 on the SSDs 2450, which allows more data to fit onto fewer, smaller SSDs.

This may be achieved by dividing the index into two parts, the more-important part (called the "head") and the less-important part (called the "tail"). There are several ways this can be done. The index can utilize the URL rank, which is a ranking for the URL without regard to any particular query word. Other alternatives include host ranking, or the rank of the URL for each individual query term. URL rank and host rank have the desirable property that for all queries, a particular URL will have 100% of its data in either the head or tail parts of the index. The head parts of the index and tail part of the index may be replicated, labeled and stored 2430, 2440 accordingly by one or more servers 2420.

The heads of the index may then be stored in SSDs 2450 at a replication level greater than the tails. In this example, the more relevant index is the three replicas R3 2430a-2430c while the tail index is a single replication R1 2440. The first benefit from this is that the total SSD storage used is much smaller than the storage needed to store the entire index at R3.

When a query is evaluated by servers 2420, it is sent to a large number of the servers 2420, each of which evaluates the query against the shards of the index stored locally (e.g., on the same server) 2430. Some of these servers 2420 finish computing the answer more slowly than others, and eventually the server that is coordinating the query gives up on the stragglers that do not finish by a deadline.

With the heads stored at R3 2430, three different servers (server 1, server 2, and server 27) are working on each shard of the heads respectively, making it much less likely that the coordination server 2410 will fail to receive answers for the entire head of the index by the deadline.

It will be appreciated that one or more features described herein may be combined with one another, and/or may additionally include or be combined with one or more features described in Provisional Patent Application No. 61/218,889, Provisional Patent Application No. 61/408,606, Provisional Patent Application No. 61/420,267, and PCT Application No. PCT/US10/39395, which are hereby incorporated by reference.

It will further be appreciated that some elements described above share the same reference numerals, where the corresponding description applies to these elements sharing the same reference numerals. In the interest of brevity, the description common to these elements have not been described again.

The foregoing description, for purpose of explanation, has been described with reference to specific embodiments. However, the illustrative discussions above are not intended to be exhaustive or to limit the invention(s) to the precise forms disclosed. Many modifications and variations are possible in view of the above teachings. The embodiments were chosen and described in order to best explain the principles of the invention(s) and its practical applications, to thereby enable others skilled in the art to best utilize the invention(s) and various embodiments with various modifications as are suited to the particular use contemplated.

What is claimed:

1. A search engine system, comprising:
a server having a hardware processor and memory storing instructions configured to cause the server to:
receive a user-input search query including:
one or more key words,
a user-input slashtag including a term wrapped in a predetermined syntax, and
a user-input boosting indicator including a user-input character prepended to the predetermined syntax of the user-input slashtag within the user-input search query;
detect within the user-input search query the user-input slashtag and the user-input boosting indicator associated with the user-input slashtag, where the user-input slashtag refers to a predetermined collection of websites;
in response to detecting the user-input boosting indicator:
generate a first search result that includes a boosted ranking of at least a subset of a plurality of search result items in the first search result associated with the user-input slashtag; and
display the first search result in a web browser.

2. The system of claim 1, wherein the first search result is generated by:
performing a search for the one or more key words to obtain search results, the search results including the search result items;
determining a subset of the search result items that are present in the user-input slashtag;
identifying a rank associated with each item of the subset of the search result items;
adjusting the rank associated with each item of the subset of the search result to create a plurality of boosted ranks; and
adjusting an order of the first search result to create a boosted order, utilizing the plurality of boosted ranks.

3. The system of claim 2, wherein the rank is adjusted by multiplying the rank by a predetermined factor to create the plurality of boosted ranks.

4. The system of claim 2, wherein the rank is adjusted by adding a constant to the rank to create the plurality of boosted ranks.

5. The system of claim 1, wherein the user-input slashtag contains a list of previous URLs clicked on by the user, and the user-input slashtag is encrypted using a key provided by the user and is decrypted each time the user-input slashtag is used.

6. The system of claim 1, wherein generating the first search result includes:
- performing a search for the one or more key words to obtain search results, the search results including a plurality of websites;
- determining a subset of the search results, where the subset includes all websites of the plurality of websites that are located within the predetermined collection of websites referred to by the user-input slashtag;
- identifying a rank associated with each website of the subset of the search results;
- increasing the rank associated with each website of the subset of the search results by a predetermined factor to create a boosted rank for each website of the subset of the search results;
- determining an order of the plurality of websites of the search results, utilizing a rank associated with each of the plurality of websites of the search results, and the boosted rank for each website of the subset of the search results; and
- displaying the plurality of websites of the search results in the determined order as the first search result.

7. The system of claim 1, wherein the user-input slashtag is encrypted using a key provided by the user and is decrypted each time the user logs in to the search engine system, where a content of the user-input slashtag is discarded after the user has been idle for a predetermined amount of time.

8. The system of claim 1, wherein generating the first search result includes:
- performing a search for the one or more key words to obtain search results, the search results including a plurality of websites;
- determining a subset of the search results, where the subset includes all websites of the plurality of websites that are located within the predetermined collection of websites referred to by the user-input slashtag, the predetermined collection of websites including all URLs previously selected by the user and one or more additional users associated with the user from one or more search engine results pages;
- identifying a rank associated with each website of the subset of the search results;
- increasing the rank associated with each website of the subset of the search results by a predetermined factor to create a boosted rank for each website of the subset of the search results;
- determining an order of the plurality of websites of the search results, utilizing a rank associated with each of the plurality of websites of the search results, and the boosted rank for each website of the subset of the search results; and
- displaying the plurality of websites of the search results in the determined order as the first search result.

9. The system of claim 1, wherein the server is further configured to:
- generate a second search result, the second search result being generated without the boosted criteria; and
- provide a link to select the second search result, wherein the first search result and the second search result are displayed next to each other on the same web page;
- wherein each result item of the first search result or second search result comprises a two-line format, wherein the first line is dedicated to a page URL title that hyperlinks to the respective page URL; and the second line is dedicated to at least a subset of a group consisting of a website title, one or more content tags, one or more site tags, and an optional snippet;
- wherein the one or more site tags include, displayed at a web browser, at least a subset of a group consisting of: links, seo, rss, cache, source, ip, rank, hostrank, and adsense;
- wherein the one or more site tags further include a social network indicator to enable a user to indicate a preference of the respective search result item.

10. The system of claim 1, wherein generating the first search result includes:
- performing a search for the one or more key words to obtain search results, the search results including a plurality of websites;
- determining a subset of the search results, where the subset includes all websites of the plurality of websites that are located within the predetermined collection of websites referred to by the user-input slashtag, the predetermined collection of websites including all URLs previously selected by the user from one or more search engine results pages;
- identifying a rank associated with each website of the subset of the search results:
- increasing the rank associated with each website of the subset of the search results by a predetermined factor to create a boosted rank for each website of the subset of the search results;
- determining an order of the plurality of websites of the search results, utilizing a rank associated with each of the plurality of websites of the search results, and the boosted rank for each website of the subset of the search results; and
- displaying the plurality of websites of the search results in the determined order as the first search result.

11. The system of claim 1, further comprising a first hardware storage and a second hardware storage, each configured to interface with the server, wherein the first storage is configured to store search engine index data, and wherein the second storage is configured to store a subset of search engine index data determined to be more important.

12. The system of claim 1, wherein the server is further configured to:
- obtain a first list of search engine result pages (SERPs), each SERP including a uniform resource locator (URL) and having an associated weight, utilizing at least a portion of the user-input search query, where the first list is organized in a first order;
- boost a ranking of at least a portion of the first list of SERPs by:
  - identifying one or more SERPs in the first list that have an associated URL matching a URL in the user-input slashtag, and
  - increasing the associated weight of the one or more SERPs located in the user-input slashtag; and
- determine a second list of SERPs organized in a second order different from the first order, utilizing the increased associated weight of the one or more SERPs located in the user-input slashtag.

13. The system of claim 12, wherein the server is further configured to:

receive a request to display only the SERPs having a boosted ranking; and display to the user only the SERPs in the first list that are identified having an associated URL matching a URL in the user-input slashtag.

\* \* \* \* \*